US012662132B2

(12) United States Patent
Ucar et al.

(10) Patent No.: US 12,662,132 B2
(45) Date of Patent: Jun. 23, 2026

(54) ASSIGNMENT IN A VEHICULAR MICRO CLOUD BASED ON SENSED VEHICLE MANEUVERING

(71) Applicant: Toyota Motor Engineering & Manufacturing North America, Inc., Plano, TX (US)

(72) Inventors: Seyhan Ucar, Mountain View, CA (US); Takamasa Higuchi, Mountain View, CA (US); Onur Altintas, Mountain View, CA (US)

( * ) Notice: Subject to any disclaimer, the term of this patent is extended or adjusted under 35 U.S.C. 154(b) by 852 days.

(21) Appl. No.: 17/352,105

(22) Filed: Jun. 18, 2021

(65) Prior Publication Data
US 2022/0402503 A1 Dec. 22, 2022

(51) Int. Cl.
| | |
|---|---|
| *B60W 40/09* | (2012.01) |
| *B60W 40/10* | (2012.01) |
| *G06N 20/00* | (2019.01) |
| *H04W 4/46* | (2018.01) |

(52) U.S. Cl.
CPC ............ *B60W 40/09* (2013.01); *B60W 40/10* (2013.01); *G06N 20/00* (2019.01); *H04W 4/46* (2018.02); *B60W 2554/4046* (2020.02); *B60W 2554/4049* (2020.02)

(58) Field of Classification Search
CPC ........ B60W 40/09; B60W 40/10; H04W 4/46; H04W 4/44; G06N 20/00
See application file for complete search history.

(56) References Cited

U.S. PATENT DOCUMENTS

| | | | | |
|---|---|---|---|---|
| 10,739,787 | B2 * | 8/2020 | Vladimerou | ............. G08G 1/22 |
| 10,992,752 | B2 | 4/2021 | Graefe et al. | |
| 11,747,827 | B2 * | 9/2023 | Xu | ........................ G05D 1/0297 |
| | | | | 701/482 |
| 2014/0005906 | A1 * | 1/2014 | Pandita | ................. B60W 30/17 |
| | | | | 706/46 |
| 2019/0079659 | A1 | 3/2019 | Adenwala et al. | |

(Continued)

OTHER PUBLICATIONS

Higuchi, T et al., "Content Replication in Vehicular Micro Cloud-based Data Storage: a Mobility-Aware Approach," IEEE Vehicular Networking Conference (VNC), 2018, pp. 1-4. (Year: 2018).*

(Continued)

*Primary Examiner* — Wade Miles
*Assistant Examiner* — Mohammed Yousef Abuelhawa
(74) *Attorney, Agent, or Firm* — Burbage Law, P.C.; Jon-Michael Burbage

(57) ABSTRACT
The disclosure includes embodiments for improving an operation of a vehicular micro cloud by increasing a continuity of a vehicular micro cloud service provided by the vehicular micro cloud. A method includes maintaining a data structure of stored driving maneuver shapes, wherein each stored driving maneuver shape includes a set of driving maneuvers. The method includes sensing a candidate vehicle and a driving maneuver shape of the candidate vehicle. The method includes determining a matching driving maneuver shape from the stored driving maneuver shapes based on a match between the driving maneuver shape of the candidate vehicle and at least a portion of the matching driving maneuver shape. The method includes estimating a next driving maneuver of the candidate vehicle. The method includes assigning a role to the candidate vehicle in the vehicular micro cloud based on the next driving maneuver of the candidate vehicle.

20 Claims, 7 Drawing Sheets

(56) References Cited

U.S. PATENT DOCUMENTS

| | | | | |
|---|---|---|---|---|
| 2019/0132819 | A1* | 5/2019 | Tseng | H04W 4/80 |
| 2020/0004242 | A1* | 1/2020 | Kim | G05D 1/0088 |
| 2020/0010051 | A1* | 1/2020 | Dumov | G06V 40/172 |
| 2020/0128066 | A1 | 4/2020 | Sugimoto | |
| 2020/0193814 | A1 | 6/2020 | Yang et al. | |
| 2020/0409391 | A1* | 12/2020 | Zhu | H04W 4/46 |
| 2022/0139229 | A1* | 5/2022 | Hong | G08G 1/22 |
| | | | | 701/26 |
| 2022/0176986 | A1* | 6/2022 | Lei | B60W 60/001 |

OTHER PUBLICATIONS

Zhang, Rusheng et al., "Leader selections in Vehicular Ad-hoc Networks: a Proactive Approach," 2020 91st Vehicular Technology Conference (VTC2020—Spring, arXiv, 2020, 5 pages.

Higuchi, T. et al., "Content Replication in Vehicular Micro Cloud-based Data Storage: a Mobility-Aware Approach," IEEE Vehicular Networking Conference (VNC), 2018, 4 pages.
Higuchi, Takamasa et al., "How to Keep a Vehicular Micro Cloud Intact," 2018 IEEE 87th Vehicular Technology Conference (VTC Spring), 2018, 5 pages.
Dressler, Falko et al., "Virtual Edge Computing Using Vehicular Micro Clouds," 2019 International Conference on Computing, Networking and Communications (ICNC), 2019, pp. 537-541.
Zhou, S. et al., "Exploiting Moving Intelligence: Delay-Optimized Computation Offloading in Vehicular Fog Networks," IEEE Communications Magazine, vol. 57, No. 5, May 2019, pp. 49-55.
Raza, Salman et al., "A Survey on Vehicular Edge Computing: Architecture, Applications, Technical Issues, and Future Directions," Wireless Communications and Mobile Computing, vol. 2019, Article ID 3159762, 2019, 19 pages.

* cited by examiner

400

500

```
                            ┌─────────┐
                            │  Start  │
                            └─────────┘
                                 │
                                 ▼
```

Maintain a data structure of stored driving maneuver shapes

505

Sense a candidate vehicle and a driving maneuver shape of the candidate vehicle

510

Determine a matching driving maneuver shape from the stored driving maneuver shapes based on a match between the driving maneuver shape of the candidate vehicle and at least a portion of the matching driving maneuver shape

515

Estimate a next driving maneuver of the candidate vehicle

520

Assign a role to the candidate vehicle in the vehicular micro cloud based on the next driving maneuver of the candidate vehicle to improve the operation of the vehicular micro cloud by increasing the continuity of the vehicular micro cloud service provided by the vehicular micro cloud

ASSIGNMENT IN A VEHICULAR MICRO CLOUD BASED ON SENSED VEHICLE MANEUVERING

BACKGROUND

The specification relates to assignment in a vehicular micro cloud based on sensed vehicle maneuvering for improved performance of the vehicular micro cloud in completing vehicular micro cloud tasks.

Vehicular micro clouds may take multiple forms. For example, a vehicular micro cloud may be stationary and include preassigned roles for each of the vehicles. In another example, the vehicular micro cloud may be mobile and the assignments may be applied on demand. In yet another example, multiple interdependent micro clouds may exist and include some overlaps, where the roles are a mixture of preassigned and on-demand. To provide continuous service, the collaboration among the micro cloud members should be uninterrupted. Uninterrupted service is difficult to achieve because many vehicles are entering and leaving the vehicular micro cloud at the same time.

Modern vehicles broadcast V2X messages that include digital data describing their locations, speeds, headings, past actions, and future actions, etc. Vehicles that broadcast V2X messages are referred to as "V2X transmitters." Vehicles that receive the V2X messages are referred to as "V2X receivers."

Although the V2X messages may include information about future actions of vehicles, it is still difficult to predict the timing of when the vehicles will leave a vehicular micro cloud. As a result, it is difficult to assign roles to vehicles within the vehicular micro cloud. Leaving vehicles may elect a set of micro cloud members to hand over their role and/or data or assign their incomplete tasks. However, if these micro cloud member elections are not done intelligently, the wrong election and/or assignment may ruin the overall process and significantly degrade the overall benefits.

SUMMARY

Existing solutions to the problem of predicting when a vehicle may leave a vehicular micro cloud include requiring accurate location information as well as precise road geometry to predict the future trajectories. The consistency of this approach varies because the success rate depends on the accuracy of multiple parameters. In addition, existing solutions necessitate nodes to be aware of network connectivity constantly and need to handle node join and leave explicitly to accurately construct a dynamic geometric graph. Lastly, these metrics are shown to result in frequent switches in election and assignment among vehicles. For example, the leadership role is changed frequently. This creates a gap period during the process, which ruins the overall benefit of vehicular micro cloud.

To improve vehicular micro cloud operations, described herein are embodiments of a system that intelligently elects a subset of vehicles for a stable assignment, such as a leadership role assignment. A continuity system observes vehicles' entrance maneuver and tracks the action of vehicles while they are micro cloud members. The observed tracked maneuver/action shapes are mined and leveraged while performing a new election/assignment.

Examples of the embodiments are now described. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for improving an operation of a vehicular micro cloud by increasing a continuity of a vehicular micro cloud service provided by the vehicular micro cloud. The method also includes maintaining a data structure of stored driving maneuver shapes, wherein each stored driving maneuver shape includes a set of driving maneuvers. The method includes sensing a candidate vehicle and a driving maneuver shape of the candidate vehicle. The method includes determining a matching driving maneuver shape from the stored driving maneuver shapes based on a match between the driving maneuver shape of the candidate vehicle and at least a portion of the matching driving maneuver shape. The method includes estimating a next driving maneuver of the candidate vehicle. The method includes assigning a role to the candidate vehicle in the vehicular micro cloud based on the next driving maneuver of the candidate vehicle. Other embodiments of this aspect include corresponding computer systems, apparatus, and computer programs recorded on one or more computer storage devices, each configured to perform the actions of the methods.

Implementations may include one or more of the following features. The method where estimating the next driving maneuver is based on the set of driving maneuvers in the matching driving maneuver shape including steps not yet performed by the candidate vehicle. The method where estimating the next driving maneuver of the candidate vehicle is performed by a machine-learning model and the machine-learning model was trained using one or more of data from a digital twin simulation, observed behavior of drivers that is location dependent, or accident data that is location dependent. The operations further include sensing that the candidate vehicle left the vehicular micro cloud and modifying parameters of the machine-learning model. The method where sensing the driving maneuver shape of the candidate vehicle occurs responsive to the candidate vehicle entering the vehicular micro cloud. The method where the role includes serving as a hub for the vehicular micro cloud. The method where the role includes executing one or more vehicular micro cloud tasks whose execution provides the vehicular micro cloud service. The method is executed by an edge server that is an element of a roadside unit. The method where the role is determined based at least in part on an execution of a set of digital twin simulations. The method where the next driving maneuver is estimated based at least in part on an execution of a set of digital twin simulations. The method where the matching driving maneuver shape is determined based at least in part on an execution of a set of digital twin simulations. The method where the stored driving maneuver shapes are determined based at least in part on execution of a set of digital twin simulations. The method where the next driving maneuver indicates that the candidate vehicle is predicted to leave the vehicular micro cloud within a predetermined time period and the role is assigned based on predicting that the candidate vehicle will leave the vehicular micro cloud within the predetermined time period.

One general aspect includes a system including a non-transitory memory; a vehicle control system; and a processor communicatively coupled to the non-transitory memory and the vehicle control system, where the non-transitory memory stores computer readable code that is operable, when executed by the processor, to cause the processor to execute steps including: maintaining a data structure of stored driving maneuver shapes, wherein each stored driving maneuver shape includes a set of driving maneuvers, sensing a candidate vehicle and a driving maneuver shape of the candidate vehicle, determining a matching driving maneuver shape from the stored driving maneuver shapes based on a match between the driving maneuver shape of the candidate vehicle and at least a portion of the matching driving maneuver shape, estimating a next driving maneuver of the candidate vehicle, and assigning a role to the candidate vehicle in the vehicular micro cloud based on the next driving maneuver of the candidate vehicle. Other embodiments of this aspect include corresponding computer systems, apparatus, and computer programs recorded on one or more computer storage devices, each configured to perform the actions of the system.

Implementations may include one or more of the following features. The system where estimating the next driving maneuver is based on the set of driving maneuvers in the matching driving maneuver shape including steps not yet performed by the candidate vehicle. The system where estimating the next driving maneuver of the candidate vehicle is performed by a machine-learning model and the machine-learning model was trained using one or more of data from a digital twin simulation, observed behavior of drivers that is location dependent, or accident data that is location dependent. The operations further include sensing that the candidate vehicle left the vehicular micro cloud and modifying parameters of the machine-learning model. The system where sensing the driving maneuver shape of the candidate vehicle occurs responsive to the candidate vehicle entering the vehicular micro cloud. The system where the role includes serving as a hub for the vehicular micro cloud.

One general aspect includes a computer program product including computer code stored on a non-transitory memory that is operable, when executed by an onboard vehicle computer, to cause the onboard vehicle computer to execute processes including: maintaining a data structure of stored driving maneuver shapes, wherein each stored driving maneuver shape includes a set of driving maneuvers, sensing a candidate vehicle and a driving maneuver shape of the candidate vehicle, determining a matching driving maneuver shape from the stored driving maneuver shapes based on a match between the driving maneuver shape of the candidate vehicle and at least a portion of the matching driving maneuver shape, estimating a next driving maneuver of the candidate vehicle, and assigning a role to the candidate vehicle in the vehicular micro cloud based on the next driving maneuver of the candidate vehicle.

BRIEF DESCRIPTION OF THE DRAWINGS

The disclosure is illustrated by way of example, and not by way of limitation in the figures of the accompanying drawings in which like reference numerals are used to refer to similar elements.

FIG. 5 is a flowchart of an example method for operation of a vehicular micro cloud by increasing a continuity of a vehicular micro cloud service provided by the vehicular micro cloud according to some embodiments.

DETAILED DESCRIPTION

Vehicular Micro Clouds

Vehicular micro clouds are an excellent way to share resources between vehicles. Some or all of the vehicles that are registered with a continuity system as described in greater detail below are connected vehicles (e.g., vehicles that include a processor, a communication unit, and an instance of the continuity system) and members of a vehicular micro cloud. In some embodiments, the vehicular micro cloud hosts the continuity system in a distributed fashion using the computing resources of the vehicles that are members of the vehicular micro cloud so that a cloud server and/or an edge server is not strictly necessary to provide the service of the continuity system to the users of the continuity system. Some of the embodiments described herein do not include vehicular micro cloud.

In some embodiments, a server such as a cloud server and/or an edge server is also an element of the vehicle micro cloud. The server may include the continuity system. The server may be installed in a roadway device such as a roadside unit (RSU) and the continuity system may send instructions to the connected vehicles about when they have joined a vehicular micro cloud and tasks that they are assigned while they are members of the vehicular micro cloud.

Figure 1:
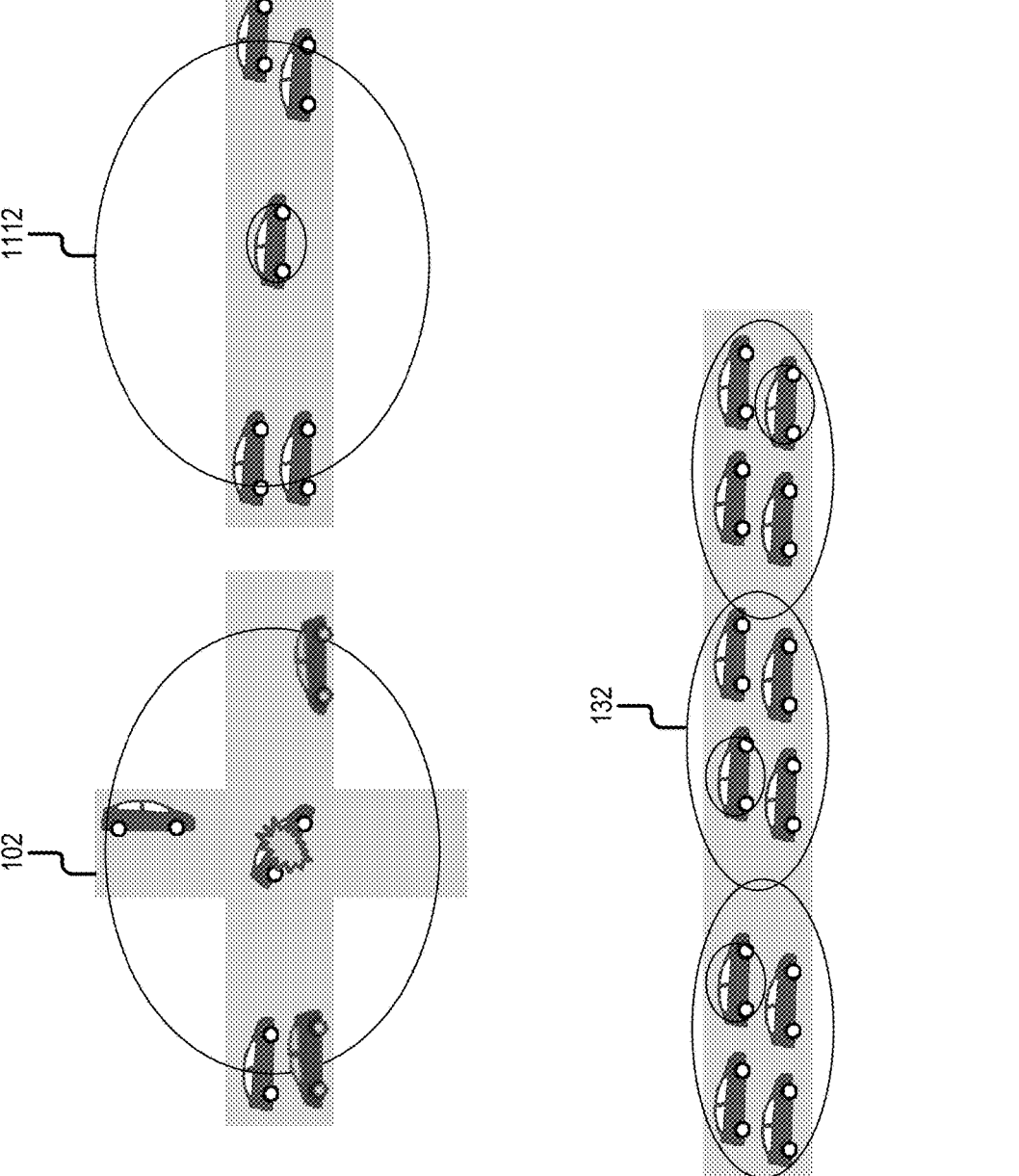
FIG. 1 is a block diagram of different types of vehicular micro clouds according to some embodiments.

In some embodiments, a vehicular micro cloud includes as a group of connected vehicles where vehicles perform task(s) cooperatively/collaboratively. FIG. 1 is a block diagram 100 that illustrates the three different types of vehicular micro clouds according to some embodiments. Vehicular micro clouds can be divided into three categories based on their mobility: (1) stationary micro cloud 102; (2) mobile micro cloud 112; and (3) interdependent micro cloud 132.

In the stationary micro cloud 102, a certain geographical region is designated as the vehicular micro cloud region, and vehicles entering that region contribute their resources for vehicular cloud services. A stationary micro cloud 102 is sometimes referred to as a "static" vehicular micro cloud. The stationary micro cloud 102 may have pre-assigned roles for the vehicles that are part of the stationary micro cloud 102. For example, one vehicle may always serve as the leader of the stationary micro cloud 102.

In the mobile micro cloud 112, on the other hand, the vehicular micro cloud moves as the micro cloud members move. A mobile micro cloud 112 is sometimes referred to as a "dynamic" vehicular micro cloud. The mobile micro cloud 112 may have on-demand roles for the vehicles that are part of the mobile micro cloud 112. For example, a vehicle may be assigned a processing task based on a sudden demand by the mobile micro cloud 112 for processing.

In the interdependent micro cloud 132, multiple vehicular micro clouds may share resources with each other. The interdependent micro cloud 132 may have both pre-assigned roles and on-demand roles.

In some embodiments, as an optional operating environment, the continuity system is hosted by a plurality of members of a vehicular micro cloud. These members are also registered with the continuity system. The continuity system causes the vehicles, which each include an instance of the continuity system or at least a subset of the code and routines of the continuity system, to execute steps to form the vehicular micro cloud.

Member data includes digital data that describes information about a vehicular micro cloud and its members. For example, the member data is digital data that describes the identity of the members of the vehicular micro cloud and their specific computing resources; all members of the vehicular micro cloud make their computing resources available to one another for their collective benefit. An example of the member data according to some embodiments includes the member data 171 depicted in FIG. 2. In some embodiments, the continuity system 199 in FIG. 2 cause a communication unit 145 to transmit a wireless message to candidates for membership in the vehicular micro cloud that causes these candidates to join the vehicular micro cloud. The list of candidates is determined by the continuity system based on the technical data which is transmitted by the candidates to one another via vehicle-to-everything (V2X) messages, such as basic safety messages (BSMs). In some embodiments, these BSMs also include sensor data recorded by the vehicles that transmit the BSMs. Vehicular micro clouds are described in more detail below according to some embodiments.

Vehicular micro clouds provide vehicular micro cloud tasks. A vehicular micro cloud task includes any task executed by a vehicular micro cloud or a group of vehicular micro clouds. As used herein, the terms "task" and "vehicular micro cloud task" refer to the same thing. A "sub-task" as used herein is a portion of a task or vehicular micro cloud task. An example of a task includes, for example, requesting a vehicle to store infotainment content for streaming.

In some embodiments, the vehicular micro cloud tasks provided by the vehicular micro cloud includes some or all of the tasks that are necessary to provide the functionality of the continuity system described herein. In some embodiments, a vehicular micro cloud includes a group of connected vehicles that communicate with one another via V2X messages to provide the service of the continuity system to the ego vehicle and/or the members of the vehicular micro cloud.

The vehicular micro cloud includes multiple members. A member of the vehicular micro cloud includes a connected vehicle that sends and receives V2X messages via the network (e.g., the network 105 depicted in FIG. 2). In some embodiments, the network is a serverless ad-hock vehicular network. In some embodiments, the members of the network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed with members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadway device, an edge server, an edge node, or a cloud server. An infrastructure device includes any hardware infrastructure device in a roadway environment such as a traffic signal, traffic light, traffic sign, or any other hardware device that has or does not have the ability to wirelessly communicate with a wireless network.

In some embodiments, the serverless ad-hoc vehicular network includes a set of sensor rich vehicles. A sensor rich vehicle is a connected vehicle that includes a rich sensor set.

In some embodiments, an operating environment that includes the serverless ad-hoc vehicular network also includes a legacy vehicle. A legacy vehicle is a connected vehicle that includes a legacy sensor set. The overall sensing ability of the rich sensor set is greater than the overall sensing ability of the legacy sensor set. For example, a roadway environment includes a set of sensor rich vehicles and a legacy vehicle; the rich sensor set is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network but is able to provide shared rides to users because the driver of the legacy vehicle has a smart device (e.g., an electronic processor-based computing device such as a smartphone, smartwatch, tablet computer, laptop, smart glasses, etc.) which they use to receive information that enables them to participate as registered vehicles that provide shared rides to the users of the Service provided by the continuity system.

In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure that is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments. When describing the vehicular micro cloud, the term "vehicular micro cloud" can be replaced by the term "vehicular micro cloud" since a vehicular micro cloud is an example of a vehicular micro cloud in some embodiments.

Distributed data storage and computing by a group of connected vehicles (i.e., a "vehicular micro cloud") is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., some or all of the shapes data 133 described herein), shared computational power, shared bandwidth, shared memory, and cloudification services.

Some of the embodiments described herein are motivated by the emerging concept of "vehicle cloudification." Vehicle cloudification means that vehicles equipped with on-board computer unit(s) and wireless communication functionalities form a group, called a vehicular micro cloud, and collaborate with other micro cloud members over V2V networks or V2X networks to perform computation, data storage, and data communication tasks in an efficient way. These types of tasks are referred to herein as "vehicular micro cloud tasks" if plural, or a "vehicular micro cloud task" if singular.

In some embodiments, a vehicular micro cloud task includes any computational, data storage, or data communication task collaboratively performed by a plurality of the members of a vehicular micro cloud. In some embodiments, the set of tasks described below with regards to the example general method include one or more vehicular micro cloud tasks as described herein.

In some embodiments, a computational task includes a processor executing code and routines to output a result. The result includes digital data that describes the output of executing the code and routines. For example, a computational task includes a processor executing code and routines to solve a problem, and the result includes digital data that describes the solution to the problem. In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, a data storage task includes a processor storing digital data in a memory of a connected vehicle. For example, a digital data file that is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members. In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a vehicular micro cloud task is collaboratively performed by the plurality of members executing computing processes in parallel which are configured to complete the execution of the vehicular micro cloud task.

In some embodiments, a vehicular micro cloud includes a plurality of members that execute computing processes whose completion results in the execution of a vehicular micro cloud task. For example, the serverless ad-hoc vehicular network provides a vehicular micro cloud task to a legacy vehicle.

Vehicular micro clouds are beneficial, for example, because they help vehicles to perform computationally expensive tasks (e.g., determining the analysis data, executing the digital twin simulations, etc.) that they could not perform alone or store large data sets that they could not store alone. In some embodiments, the computational power of a solitary ego vehicle is sufficient to execute these tasks.

Vehicular micro clouds are described in the patent applications that are incorporated by reference in this paragraph. This patent application is related to the following patent applications, the entirety of each of which is incorporated herein by reference: U.S. patent application Ser. No. 15/358, 567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud"; U.S. patent application Ser. No. 16/443,087 filed on Jun. 17, 2019 and entitled "Cooperative Parking Space Search by a Vehicular Micro Cloud"; U.S. patent application Ser. No. 16/739,949 filed on Jan. 10, 2020 and entitled "Vehicular Micro Clouds for On-demand Vehicle Queue Analysis"; U.S. patent application Ser. No. 16/735,612 filed on Jan. 6, 2020 and entitled "Vehicular Micro Cloud Hubs"; U.S. patent application Ser. No. 16/387,518 filed on Apr. 17, 2019 and entitled "Reorganizing Autonomous Entities for Improved Vehicular Micro Cloud Operation"; U.S. patent application Ser. No. 16/273, 134 filed on Feb. 11, 2019 and entitled "Anomaly Mapping by Vehicular Micro Clouds"; U.S. patent application Ser. No. 16/246,334 filed on Jan. 11, 2019 and entitled "On-demand Formation of Stationary Vehicular Micro Clouds"; and U.S. patent application Ser. No. 16/200,578 filed on Nov. 26, 2018 and entitled "Mobility-oriented Data Replication in a Vehicular Micro Cloud."

In some embodiments, a typical use case of vehicular micro clouds is a data storage service, where vehicles in a micro cloud collaboratively keep data contents in their on-board data storage device. The vehicular micro cloud allows vehicles in and around the vehicular micro cloud to request the data contents from micro cloud member(s) over V2V communications, reducing the need to access remote cloud servers by vehicle-to-network (e.g., cellular) communications. For some use cases, micro cloud members may also update the cached data contents on the spot with minimal intervention by remote cloud/edge servers (e.g., updating a high-definition road map based on measurements from on-board sensors). This paragraph is not intended to limit the functionality of the embodiments described herein to data storage. As described herein, the embodiments are operable to provide other vehicular micro cloud tasks in addition to data storage tasks.

In some embodiments, the functionality provided by the continuity system is a task provided by the vehicular micro cloud. For example, the continuity system is an element of a hub of a vehicular micro cloud. The continuity system receives a set of wireless messages and this triggers the continuity system to form a vehicular micro cloud. The continuity system processes V2X data for the benefit of one or more members of the vehicular micro cloud. For example, the ego vehicle includes computational power that exceeds that of another member, and the ego vehicle processes wireless messages for this member which would otherwise be unable to do so, or unable to do so in a timeframe that satisfies a threshold for latency. Hub vehicles are described in more detail below.

The endpoints that are part of the vehicular micro cloud may be referred to herein as "members," "micro cloud members," or "member vehicles." Examples of members include one or more of the following: a connected vehicle; an edge server; a cloud server; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit include some or all of the ego sensor data and time data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

Figure 2:
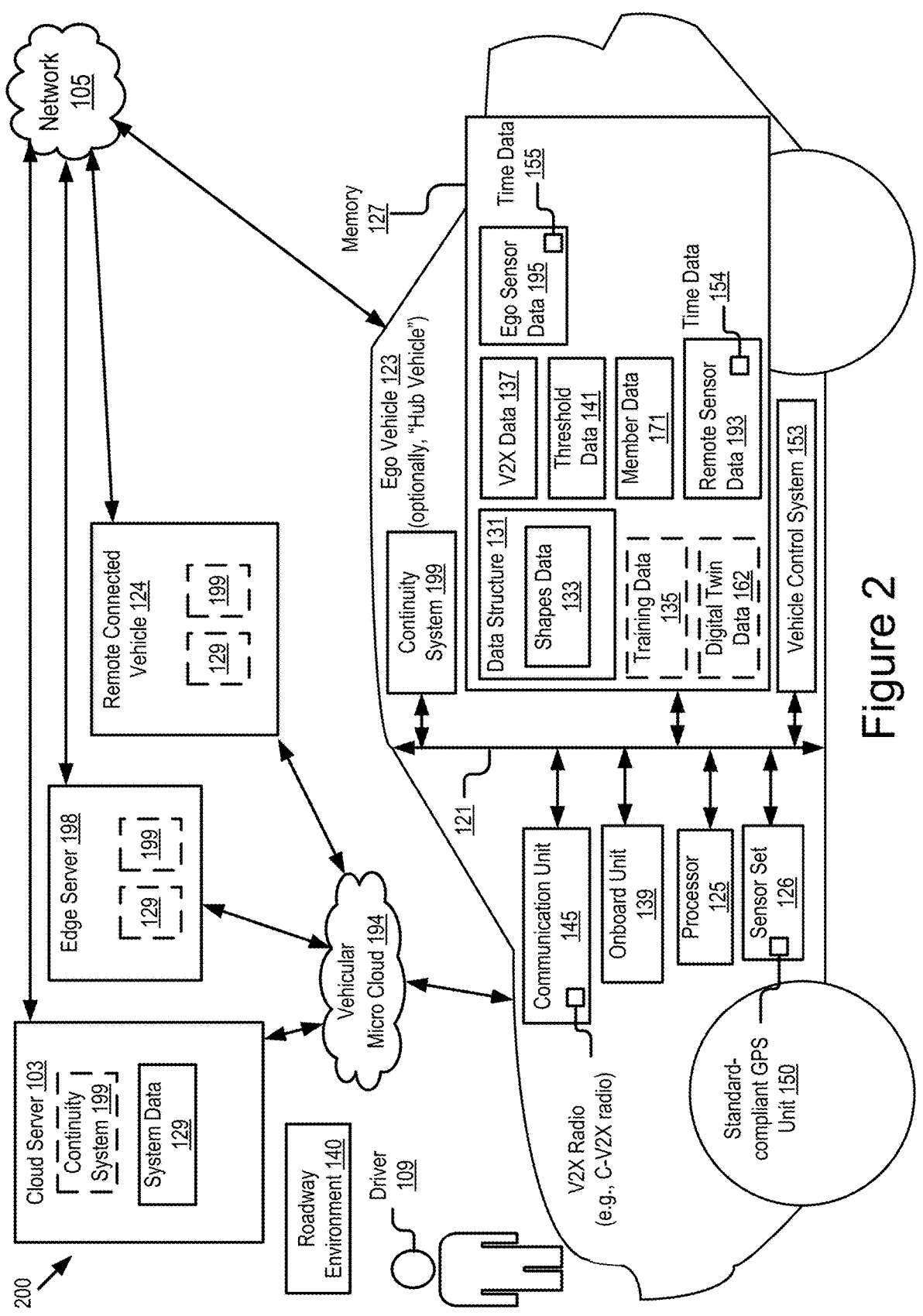
FIG. 2 is a block diagram illustrating an operating environment for a continuity system according to some embodiments.

As used herein, the term "vehicle" refers to a connected vehicle. For example, the ego vehicle and remote connected vehicle depicted in FIG. 2 are connected vehicles.

A connected vehicle is a conveyance, such as an automobile, that includes a communication unit that enables the conveyance to send and receive wireless messages via one or more vehicular networks. The embodiments described herein are beneficial for both drivers of human-driven vehicles as well as the autonomous driving systems of autonomous vehicles. For example, the continuity system improves the performance of a vehicular micro cloud, which benefits the performance of the vehicle itself by enabling it to operate more safely or in a manner that is more satisfactory to a human driver of the ego vehicle.

In some embodiments, the continuity system improves the performance of a network because it beneficially takes steps to enable the completion of vehicular micro cloud tasks.

In some embodiments, the continuity system improves the performance of a connected vehicle because it beneficially estimates a next driving maneuver of a candidate vehicle and assigns a role to the candidate vehicle in the vehicular micro cloud accordingly.

In some embodiments, the continuity system is software installed in an onboard unit (e.g., an electronic control unit (ECU)) of a vehicle having V2X communication capability. The vehicle is a connected vehicle and operates in a roadway environment with N number of remote connected vehicles that are also connected vehicles, where N is any positive whole number that satisfies a threshold for forming a vehicular micro cloud. The roadway environment may include one or more of the following example elements: an ego vehicle; N remote connected vehicles; an edge server; and a roadside unit. For the purpose of clarity, the N remote connected vehicles may be referred to herein as the "remote connected vehicle" or the "remote connected vehicles" and this will be understood to describe N remote connected vehicles.

In some embodiments, the continuity system includes code and routines stored on and executed by a cloud server or an edge server.

An example of a roadway environment according to some embodiments includes the roadway environment 140 depicted in FIG. 2. As depicted, the roadway environment 140 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The ego vehicle and the remote connected vehicles may be human-driven vehicles, autonomous vehicles, or a combination of human-driven vehicles and autonomous vehicles. In some embodiments, the ego vehicle and the remote connected vehicles may be equipped with DSRC equipment such as a GPS unit that has lane-level accuracy and a DSRC radio that is capable of transmitting DSRC messages, such as BSMs.

In some embodiments, the ego vehicle and some or all of the remote connected vehicles include their own instance of a continuity system. For example, in addition to the ego vehicle, some or all of the remote connected vehicles include an onboard unit having an instance of the continuity system installed therein.

In some embodiments, the ego vehicle and one or more of the remote connected vehicles are members of a vehicular micro cloud. In some embodiments, the remote connected vehicles are members of a vehicular micro cloud, but the ego vehicle is not a member of the vehicular micro cloud. In some embodiments, the ego vehicle and some, but not all, of the remote connected vehicles are members of the vehicular micro cloud. In some embodiments, the ego vehicle and some or all of the remote connected vehicles are members of the same vehicular macro cloud but not the same vehicular micro cloud, meaning that they are members of various vehicular micro clouds that are all members of the same vehicular macro cloud so that they are still interrelated to one another by the vehicular macro cloud.

An example of a vehicular micro cloud according to some embodiments includes the vehicular micro cloud 194 depicted in FIG. 2. Accordingly, in some embodiments multiple instances of the continuity system are installed in a group of connected vehicles. The group of connected vehicles are arranged as a vehicular micro cloud.

Sensor Data

Vehicles include onboard sensors that constantly record sensor data describing their external environment. In some embodiments, the sensor data is time stamped so that individual sensor measurements recorded by the onboard sensors include a time stamp describing the time when the sensor measurement was recorded. Time data includes digital data that describes the time stamps for the sensor measurements that are described by the sensor data. Vehicles transmit V2X messages to one another. Examples of the time data according to some embodiments include the time data 154, 155 depicted in FIG. 2.

The sensor data includes digital data describing the sensor measurements recorded by the onboard sensors (e.g., the sensor set). These V2X messages include V2X data in their payload. The V2X data includes, among other things, the sensor data they record. Vehicles that receive these V2X messages use this V2X data to improve their awareness of their environment. For vehicles that include Advanced Driver Assistance Systems (ADAS systems) or autonomous driving systems, the V2X data is inputted to these systems so that they can better understand their driving environment when providing their functionality.

An example of one specific type of sensor data includes GPS data. "GPS" refers to "geographic positioning system." The GPS data includes digital data that describes the geographic location of an object such as a vehicle or a smartphone.

An example of the V2X data according to some embodiments includes the V2X data 137 depicted in FIG. 2. An example of the sensor data according to some embodiments includes the ego sensor data 195 and the remote sensor data 193 depicted in FIG. 2. The ego sensor data 195 includes sensor data recorded by the sensor set 126 of the ego vehicle 123. The remote sensor data 193 includes sensor data recorded by the sensor set 126 of the remote connected vehicle 124. For example, with reference to FIG. 2, the remote sensor data 193 is received by the communication unit 145 of the ego vehicle 123 via a V2X transmission that includes V2X data 137 including the remote sensor data 193 as its payload; the continuity system 199 then parses the remote sensor data 193 from the V2X data 137 and stores the V2X data 137 and the remote sensor data 193 in the memory 127 of the ego vehicle 123. In some embodiments, the V2X data 137 is received by the ego vehicle 123 because the ego vehicle 123 and the remote connected vehicle 124 are members of the same vehicular micro cloud 194.

A vehicle control system is an onboard system of a vehicle that controls the operation of a functionality of the vehicle. ADAS systems and autonomous driving systems are examples of vehicle control systems. Examples of the vehicle control system according to some embodiments include the vehicle control system 153 depicted in FIG. 2.

Example General Method

In some embodiments, the continuity system includes code and routines that are operable, when executed by a processor, to cause the processor to execute one or more steps of an example general method described herein. The continuity system may be an element of one or more of an ego vehicle, a remote connected vehicle, a cloud server, or an edge server installed in a roadway device such as a roadside unit (RSU). As described, the continuity system is an element of the ego vehicle, but this description is not intended to be limiting.

In some embodiments, these steps are executed by a processor or onboard vehicle computer of an ego vehicle. The ego vehicle is a connected vehicle. A connected vehicle is a vehicle that includes a communication unit. An example of a communication unit includes the communication unit 145 depicted in FIG. 2. The remote connected vehicle is also a connected vehicle, and so, it includes a communication unit.

As used herein, the term "wireless message" refers to a V2X message transmitted by a communication unit of a connected vehicle such as a remote connected vehicle or the ego vehicle.

An example of the example general method is now described. In some embodiments, one or more steps of the example general method are skipped. The steps of the example general method may be executed in any order, and not necessarily the order presented. In some embodiments, a plurality of vehicles on a roadway include instances of the continuity system and the continuity systems of these vehicles also execute some or all of the steps described below. For example, one or more of these steps are executed by the members of a vehicular micro cloud in some embodiments.

The steps of the example general method are now described according to some embodiments.

Step 1: A data structure of stored driving maneuver shapes is maintained. Each stored driving maneuver shape includes a set of driving maneuvers. The data structure may be maintained by the continuity system or by another system, such as a third-party system.

The data structure organizes the stored driving maneuver shapes. The data structure may be a database, such as a relational database management system (RDMS). An example of the data structure according to some embodiments includes the data structure 131 depicted in FIG. 2. Although the data structure 131 illustrated in FIG. 2 may be an in-memory database, in some embodiments, the data structure 131 is a disk-optimized database.

In some embodiments, the data structure is an element of a cloud server that is stored as part of the system data. The cloud server includes a hardware server. An example of the cloud server includes the cloud server 103 and an example of the system data is the system data 129 depicted in FIG. 2.

In some embodiments, the data structure is an element of an edge server that is stored as part of the system data. An example of the edge server according to some embodiments includes the edge server 198 and an example of the system data is the system data 129 depicted in FIG. 2. An edge server includes a hardware server. In some embodiments, the edge server is an element of a roadside device such as a roadside unit.

In some embodiments, the data structure is an element of a remote vehicle that is stored as part of the system data. An example of the remote vehicle according to some embodiments includes the ego vehicle 123 and an example of the system data is the system data 129 depicted in FIG. 2.

In some embodiments, the data structure is an element of an ego vehicle. An example of the ego vehicle according to some embodiments includes the ego vehicle 123 depicted in FIG. 2. An example of the data structure is the data structure 131 that is part of the memory 127 as illustrated in FIG. 2.

The data structure 131 in FIG. 2 is illustrated as storing shapes data 133 that includes the stored driving maneuver shapes. In some embodiments, a driving maneuver from the set of driving maneuvers for each stored driving maneuver shape includes a direction, a distance, and a time. For example, the set of driving maneuvers may include that a vehicle drove for 0.5 miles in a northern direction starting at time 1:23:45, and then moved in an eastern direction for 0.2 miles starting at time 1:24:15 (in order to change lanes), etc.

In some embodiments, the shapes data 133 is also associated with a class for each type of stored driving maneuver shape. For example, a stored driving maneuver shape may belong to a class of an aggressive driver that is likely to leave the vehicular micro cloud quickly, a driver that is changing between lanes but is likely to stay joined to the vehicular micro cloud, a driver that is changing lanes rapidly enough to indicate that the driver is likely to get off on an exit, the driver has a tendency to tailgate, the driver is distracted, etc.

In some embodiments, the shapes data 133 is derived from one or more of previous trips taken by vehicles that are part of the vehicular micro cloud, a dataset of trips taken by vehicles in general, data from a digital twin simulation, a dataset of accident data that is location dependent, etc. In some embodiments, the shapes data 133 is based on observed behavior of drivers that is location dependent such that the continuity system uses a geographic location that is within a threshold distance from the vehicles in the vehicular micro cloud. For example, the shapes data 133 may match the section of US 101 in California where a vehicle is driving and take into account the road geometry of the location. This advantageously improves the accuracy of the shapes data because a driving maneuver shape that may appear to be aggressive behavior in one location (e.g., a busy highway) may be a more typical behavior in another location (e.g., a moderately busy highway with a lot of debris in the road). In some embodiments, the shapes data 133 is updated with real-time information that is location dependent. For example, if there is an obstruction in the road, the continuity system 199 does not mistakenly characterize a vehicle changing lanes to avoid the obstruction as being aggressive.

In some embodiments, the shapes data 133 includes stored driving maneuver shapes that are determined based at least in part on the execution of a set of digital twin simulations.

In some embodiments, the shapes data 133 is used as training data for a machine-learning model. The machine-learning model is discussed in greater detail below.

In some embodiments, this step 1 corresponds to step 505 in the method 500 depicted in FIG. 5 according to some embodiments.

Step 2: (Optional) The continuity system causes the sensor set of the ego vehicle to record ego sensor data. The ego sensor data includes digital data that describes the sensor measurements of the sensors that are included in the sensor set of the ego vehicle. In some embodiments, the individual sensor measurements are time stamped so an instance of ego sensor data describes both a sensor measurement and when this measurement was recorded. In some embodiments, the ego sensor data includes time data that describes the timestamps for the sensor measurements.

In some embodiments, the sensor measurements described by the ego sensor data describe one or more of the following: the ego vehicle over time including its location in a roadway environment over time; the location of the ego vehicle relative to other objects within the roadway environment over time; the driver's operation of the ego vehicle over time, the presence of other objects over time within the roadway environment that includes the ego vehicle; the location of these objects in the roadway over time relative to other objects (e.g., the location of these other objects relative to one another and relative to the ego vehicle); and the behavior of these other objects over time (e.g., a remote connected vehicle driving abnormally).

An example of the ego sensor data according to some embodiments includes the ego sensor data 195 depicted in FIG. 2. An example of the time data associated with the ego sensor data 195 according to some embodiments includes the time data 155 depicted in FIG. 2.

The sensors included in the sensor set, and the type of measurements they can record, are described in more detail below.

Step 3: A set of one or more remote connected vehicles in sensor range of the ego vehicle include their own instance of the continuity system. The continuity system of these remote connected vehicles causes the sensor sets of these remote connected vehicles to record sensor measurements of their roadway environment. These sensor measurements include sensor measurements of the ego vehicle and the behavior of the ego vehicle over time.

The sensor measurements recorded by an individual remote connected vehicle from the set of remote connected vehicles is described by remote sensor data. The remote sensor data includes digital data that describes the sensor measurements of the sensors that are included in the sensor set of the remote connected vehicle. In some embodiments, the individual sensor measurements are time stamped so an instance of remote sensor data describes both a sensor measurement and when this measurement was recorded. In some embodiments, the remote sensor data includes time data that describes the timestamps for the sensor measurements.

In some embodiments, the sensor measurements described by the remote sensor data describe one or more of the following: the remote connected vehicle over time including its location in a roadway environment over time; the location of the remote connected vehicle relative to other objects within the roadway environment over time; a driver's operation of the remote connected vehicle over time, the presence of other objects (including the presence of the ego vehicle) over time within the roadway environment that includes the remote connected vehicle; the location of these objects (including the location of the ego vehicle) in the roadway over time relative to other objects (e.g., the location of the ego vehicle relative to the remote connected vehicle as measured from the perspective of the remote connected vehicle); and the behavior of these other objects (including the behavior of the ego vehicle) over time (e.g., abnormal driving behavior of the ego vehicle as recorded by the sensors of the remote connected vehicle as well as an event which preceded the abnormal driving behavior). In some embodiments, the remote sensor data includes information about future actions. For example, the remote sensor data may include maneuver information that will occur in the next three seconds.

An example of the remote sensor data according to some embodiments includes the remote sensor data 193 depicted in FIG. 2. An example of the time data associated with the remote sensor data 193 according to some embodiments includes the time data 154 depicted in FIG. 2.

The sensors included in the sensor sets of the remote connected vehicles are similar to those included in the ego vehicle.

In some embodiments, the ego vehicle and the set of remote connected vehicles described in step 3 are all members of a vehicular micro cloud.

Step 4: The continuity systems of the set of remote connected vehicles described in step 3 build V2X messages including V2X data. V2X data includes digital data that is the payload for a V2X message. An example of the V2X data according to some embodiments includes the V2X data 137 depicted in FIG. 2. In some embodiments, the continuity systems of the set of remote connected vehicles described in step 3 build V2X data 137 including their remote sensor data 193 and time data 154; these continuity systems build V2X messages including the V2X data 137 as their payloads and cause the communication units of these remote connected vehicles to transmit V2X messages including the V2X messages. Each instance of V2X data 137 for each remote connected vehicle includes a plurality of instances of remote sensor data 193 and corresponding time data 154 for the sensor measurements described by this remote sensor data 193. Each of the remote connected vehicles builds its own V2X message including its own V2X data. Each continuity system of each remote connected vehicle causes the communication unit of each of the remote connected vehicles to broadcast its own V2X message.

Step 5: The V2X messages broadcast at step 4 are received by the communication unit of the ego vehicle. The continuity system of the ego vehicle parses the V2X data 137 from the V2X messages received by the communication unit of the ego vehicle and stores the V2X data 137 in the memory of the ego vehicle. The continuity system of the ego vehicle parses the remote sensor data 193 and the time data 154 from these instances of V2X data 137 and stores the remote sensor data 193 and the time data 154 in the memory. In this way the continuity system of the ego vehicle receives the remote sensor data 193 and the time data 154 from a set of remote connected vehicles. The continuity system of the ego vehicle therefore has access to a rich data set including its own ego sensor data 195 and the remote sensor data 193 of a set of remote connected vehicles 124 to consider in the subsequent steps of this example general method.

Step 6: The continuity system of the ego vehicle analyzes the available sensor data in order to sense a candidate vehicle and a driving maneuver shape of the candidate vehicle. The candidate vehicle may be the remote vehicle 124 illustrated in FIG. 2.

The sensor data includes one or more sets of remote sensor data received at step 5 and, optionally, the ego sensor data. The ego sensor data and the remote sensor data are referred to separately or collectively as the "sensor data." The continuity system identifies the sensor data related to the candidate vehicle from the remote sensor data 193 and the time data 154. In some embodiments, the continuity system generates the driving maneuver shape of the candidate vehicle from the sensor data.

In some embodiments, the continuity system senses the candidate vehicle and the driving maneuver shape after the candidate vehicle enters the vehicular micro cloud.

In some embodiments, the continuity system determines that the driving maneuver shape adheres to a particular pattern.

In some embodiments, this step 6 corresponds to step 510 in the method 500 depicted in FIG. 5 according to some embodiments.

Step 7: The continuity system of the ego vehicle determines a matching driving maneuver shape from the stored driving maneuver shapes based on a match between the driving maneuver shape of the candidate vehicle and at least a portion of the matching driving maneuver shape.

In some embodiments, the continuity system queries the data structure 131 to determine if the driving maneuver shape of the candidate vehicle matches one or more matching driving maneuver shapes. Because the matching driving maneuver shapes may have more driving maneuvers than the full set of driving maneuvers in the matching driving maneuver shapes, the continuity system may select the best match. For example, the match may be determined based on each driving maneuver in the driving maneuver shape being within a threshold similarity value of a corresponding matching driving maneuver from the stored driving maneuver shapes. In some embodiments, the continuity system uses the threshold data 141 to determine whether the driving maneuver shape has a matching driving maneuver shape. For example, the threshold data 141 may include a requirement that the match is at least 85% between each driving maneuver in the driving maneuver shape and the corresponding matching driving maneuver.

In some embodiments, the continuity system determines a matching driving maneuver shape based at least in part on an execution of a set of digital twin simulations.

In some embodiments, the continuity system determines the matching driving maneuver shape based on the matching driving maneuver shape having a similar pattern as the driving maneuver shape of the candidate vehicle.

In some embodiments, this step 7 corresponds to step 515 in the method 500 depicted in FIG. 5 according to some embodiments.

Step 8: The continuity system of the ego vehicle estimates a next driving maneuver of the candidate vehicle.

In some embodiments, the continuity system may estimate the next driving maneuver of the candidate vehicle based on the set of driving maneuvers in the matching driving maneuver shape including steps not yet performed by the candidate vehicle. The continuity system may use the remaining steps in the matching driving maneuver shape to predict the next driving maneuver. For example, if the driving maneuver shape is half of an S-shape and the matching driving maneuver shape is a full S-shape, the next driving maneuver of the candidate vehicle may be a direction, distance, and angle that would correspond to the next step to complete the S-shape.

In some embodiments, the continuity system determines that the next driving maneuver indicates that the candidate vehicle is predicted to leave the vehicular micro cloud within a predetermined time period. For example, the continuity system may determine that the next driving maneuver (e.g., turn left, turn right) corresponds to a matching driving maneuver shape with steps not yet performed by the candidate vehicle. For example, if the matching driving maneuver shape has a ladder shape maneuver from right to left, the continuity system predicts that the next driving maneuver will perform a turning left maneuver and leave the micro cloud in the near future (e.g., within the next three minutes).

In some embodiments, the continuity system determines a reason with the prediction of the next driving maneuver. For example, the continuity system may associate the driving maneuver shape of the candidate vehicle with an aggressive driving technique (e.g., overtaking, lane cutting, etc.), a steady driving technique, a tailgating driving technique, etc.

In some embodiments, a machine-learning model outputs an estimate of the next driving maneuver of the candidate vehicle. For example, the machine-learning model may receive the driving maneuver shape of the candidate vehicle as input and the machine-learning model may output the next driving maneuver of the candidate vehicle.

In some embodiments, the continuity system estimates the next driving maneuver based on execution of a set of digital twin simulations.

Step 9: The continuity system of the ego vehicle assigns a role to the candidate vehicle in the vehicular micro cloud based on the next driving maneuver of the candidate vehicle to improve the operation of the vehicular micro cloud by increasing the continuity of the vehicular micro cloud service provided by the vehicular micro cloud. For example, the role includes executing one or more vehicular micro cloud tasks whose execution provides the vehicular micro cloud service. In another example, the role includes serving as a hub for the vehicular micro cloud.

Continuing with the example above, if the continuity system predicts that the next driving maneuver will perform a turning left maneuver and leave the micro cloud in the near future (e.g., within the next three minutes), the continuity system may determine that the candidate vehicle is not a good candidate for a new leadership role assignment since the candidate vehicle is predicted to leave the vehicular micro cloud soon.

In some embodiments, the continuity system assigns the role to the candidate vehicle in the vehicular micro cloud based on the next driving maneuver of the candidate vehicle and the class associated with the matching driving maneuver shape. For example, the continuity system may determine that the candidate vehicle is in a class of vehicles that move to avoid an obstruction and in this case the candidate vehicle will change to the right lane in order to avoid a traffic accident based on location dependent data from the stored driving maneuver shapes. In another example, the continuity system may determine that the class is that the driver is an aggressive driver, a calm driver, etc. In some embodiments, the continuity system may determine that there are some tasks that are advantageously performed by a vehicle even if it leaves the vehicular micro cloud quickly. For example, the continuity system may determine that the candidate vehicle is driving aggressively, and this may be most advantageous for disseminating a message in a rapid manner.

In some embodiments, the continuity system where the next driving maneuver indicates that the candidate vehicle is predicted to leave the vehicular micro cloud within the predetermined time period, the continuity system assigns the role based on predicting that the vehicle will leave the vehicular micro cloud within the predetermined time period.

In some embodiments, the continuity system determines the role based at least in part on an execution of a set of digital twin simulations. For example, if executing the set of digital twin simulations indicates that it is likely that the candidate vehicle will stay within the vehicular micro cloud for a certain period of time, the continuity system may assign the candidate vehicle a role or a task that is more time intensive within the vehicular micro cloud.

In instances where the continuity system does not assign a role to a candidate vehicle, for example, because it is predicted that the candidate vehicle will leave the vehicular micro cloud too quickly to perform any tasks, the continuity system may still track the candidate vehicle and update the stored driving maneuver shapes with information for the candidate vehicle.

In some embodiments, this step 9 corresponds to step 525 in the method 500 depicted in FIG. 5 according to some embodiments.

Step 10: (Optional) The continuity system of the ego vehicle senses that the candidate vehicle left the vehicular micro cloud and modifies parameters of the machine-learning model in response to the sensing. Once the candidate vehicle leaves the vehicular micro cloud, the driving maneuver shape of the candidate vehicle is complete and the driving maneuver shape can be used as a source of data for the stored driving maneuver shapes. In addition, because the machine-learning model made a prediction about the next driving maneuver for the candidate vehicle, having the data about when the candidate vehicle actually left the vehicular micro cloud can be used as feedback for the machine-learning model to determine if the machine-learning model accurately predicted the next driving maneuver. If the machine-learning model did not accurately predict the next driving maneuver, the continuity system may update the parameters for the machine-learning model based on when and how the candidate vehicle left the vehicular micro cloud.

Hub or Hub Vehicle

Hub vehicles are an optional feature of the embodiments described herein. Some of the embodiments described herein include a hub vehicle.

In some embodiments, the continuity system that executes a method as described herein (e.g., the method 500 depicted in FIG. 5, the method 600 depicted in FIG. 6, or the example general method described herein, etc.) is an element of a hub or a hub vehicle. For example, the vehicular micro cloud formed by the continuity system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 2. In some embodiments, the operating environment 200 includes a roadside unit or some other roadway device, and this roadway device is the hub of the vehicular micro cloud.

In some embodiments, the continuity system determines which candidate vehicle (e.g., the ego vehicle and one or more remote connected vehicles) will serve as the hub vehicle based on estimating a next driving maneuver for the candidate vehicle. For example, the candidate vehicle that is estimated to leave the vehicular micro cloud would make a poor hub vehicle because it could result in a gap period where no vehicles are in charge of making decisions for the vehicular micro vehicle. Other factors that may qualify a vehicle to be the hub include one or more of the following: being the most technologically sophisticated; having the most accurate sensors relative to the other members; having the most bandwidth relative to the other members; and having the most unused memory relative to the other members. Accordingly, the designation of which vehicle is the hub vehicle may be based on a set of factors that includes which candidate vehicle has: (1) the greatest likelihood of staying part of the vehicular micro cloud for the longest amount of time; (2) the fastest onboard computer; (3) the most accurate sensors relative to the other members; (4) the most bandwidth relative to the other members or other network factors such having radios compliant with the most modern network protocols; and (5) the most available memory relative to the other members.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include Basic Safety Messages (BSMs) which include such sensor data in part 2 of their payload. In some embodiments, the technical data is included in the member data (and/or sensor data) depicted in FIG. 2 which vehicles such as the ego vehicle 123 and the remote connected vehicle 124 broadcast to one another via BSMs. In some embodiments, the member data also includes the sensor data of the vehicle that transmits the BSM as well as some or all of the other digital data described herein as being an element of the member data.

In some embodiments, the technical data is an element of the sensor data (e.g., ego sensor data or remote sensor data provided by the remote connected data) which is included in the V2X data.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the continuity system is operable to provide its functionality to operating environments and network architectures that do not include a server. Use of servers is problematic in some scenarios because they create latency. For example, some prior art systems require that groups of vehicles relay all their messages to one another through a server. By comparison, the use of server is an optional feature for the continuity system. For example, the continuity system is an element of a roadside unit that includes a communication unit 145 but not a server. In another example, the continuity system is an element of another vehicle such as one of the remote connected vehicles 124.

In some embodiments, the operating environment of the continuity system includes servers. Optionally, in these embodiments the continuity system includes code and routines that predict the expected latency of V2X communications involving servers and then time the transmission of these V2X communications so that the latency is minimized or reduced.

In some embodiments, the continuity system is operable to provide its functionality even though the vehicle which includes the continuity system does not have a Wi-Fi antenna as part of its communication unit. By comparison, some of the existing solutions require the use of a Wi-Fi antenna in order to provide their functionality. Because the continuity system does not require a Wi-Fi antenna, it is able to provide its functionality to more vehicles, including older vehicles without Wi-Fi antennas.

In some embodiments, the continuity system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud. In some embodiments, vehicles which the continuity system determines are ineligible to participate as members of the vehicular micro cloud are also excluded from providing rides to users as part of the service.

In some embodiments, the continuity system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the continuity system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share it unused computing resources with the other members of the vehicular micro cloud. Any group of vehicles that does not require all its members to share their unused computing resources with the other members is not a vehicular micro cloud.

In some embodiments, a vehicular micro cloud does not require a server and preferably would not include one because of the latency created by communication with a server. Accordingly, in some but not all embodiments, any group of vehicles that includes a server or whose functionality incorporates a server is not a vehicular micro cloud as this term is used herein.

In some embodiments, a vehicular micro cloud formed by a continuity system is operable to harness the unused computing resources of many different vehicles to perform complex computational tasks that a single vehicle alone cannot perform due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the continuity system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud is pre-designated by a vehicle manufacturer by the inclusion of one bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method 500 depicted in FIG. 5 or the method 600 in FIG. 6) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 2 depicts a server in an operating environment that includes the continuity system, the server is an optional feature of the operating environment. An example of a preferred embodiment of the continuity system does not include the server in the operating environment which includes the continuity system.

In some embodiments, the continuity system enables a group of vehicles to perform computationally expensive tasks that could not be completed by any one vehicle in isolation.

An existing solution to vehicular micro cloud task execution involves vehicle platoons. As explained herein, a platoon is not a vehicular micro cloud and does not provide the benefits of a vehicular micro cloud, and some embodiments of the continuity system requires vehicular micro cloud; this distinction alone differentiates the continuity system from the existing solutions. The continuity system is different from the existing solution for additional reasons. For example, the existing solution that relies on vehicle platooning does not include functionality whereby the members of a platoon are changed among the platoons dynamically during the task execution. As another example, the existing solution does not consider the task properties, road geometry, actual and/or predicted traffic information and resource capabilities of vehicles to determine the number of platoons. The existing solution also does not include functionality whereby platoons swap which sub-task they are performing among themselves while the sub-tasks are still being performed by the platoons in parallel. The existing solution also does not include functionality whereby platoons are reorganized based on monitored task executions results/performance and/or available vehicles and resources. As described herein, the continuity system includes code and routines that provide, among other things, all of this functionality which is lacking in the existing solution.

Vehicle Control System

Modern vehicles include Advanced Driver Assistance Systems (ADAS systems) or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIGS. 2 and 3.

A particular vehicle that includes these vehicle control systems is referred to herein as an "ego vehicle" and other vehicles in the vicinity of the ego vehicle as "remote connected vehicles." As used herein, the term "vehicle" includes a connected vehicle that includes a communication unit and is operable to send and receive V2X communications via a wireless network (e.g., the network 105 depicted in FIG. 2).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping vehicles to have the best possible environmental perception abilities.

Vehicles use their onboard sensors and computing resources to execute perception algorithms that inform them about the objects that are in their environment, where these objects are located in their environment, and various measurements about these objects (e.g., speed, heading, path history, etc.).

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit. An example of a standard-compliant GPS unit according to some embodiments includes the standard-compliant GPS unit 150 depicted in FIG. 2.

In some embodiments, the connected vehicle described herein, and depicted in FIG. 2, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

75 MHz of the 5.9 GHz band may be designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHz) is reserved by the jurisdiction for Cellular Vehicle to Everything (C-V2X) use. In these embodiments, the V2X radio depicted in FIG. 2 is a C-V2X radio which is operable to send and receive C-V2X wireless messages on the upper 30 MHz of the 5.9 GHz band (i.e., 5.895-5.925 GHz). In these embodiments, the continuity system 199 is operable to cooperate with the C-V2X radio and provide its functionality using the content of the C-V2X wireless messages.

In some of these embodiments, some or all of the digital data depicted in FIG. 2 is the payload for one or more C-V2X messages. In some embodiments, the C-V2X message is a BSM.

Vehicular Network

In some embodiments, the continuity system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

In some embodiments, the continuity system includes software installed in an onboard unit of a connected vehicle. This software is the "continuity system" described herein.

An example operating environment for the embodiments described herein includes an ego vehicle, one or more remote connected vehicles, and a recipient vehicle. The ego vehicle and the remote connected vehicle are connected vehicles having communication units that enable them to send and receive wireless messages via one or more vehicular networks. In some embodiments, the recipient vehicle is a connected vehicle. In some embodiments, the ego vehicle and the remote connected vehicle include an onboard unit having a continuity system stored therein.

Some of the embodiments described herein include a server. However, some of the embodiments described herein do not include a server. A serverless operating environment is an operating environment which includes at least one continuity system and does not include a server.

Figure 6:
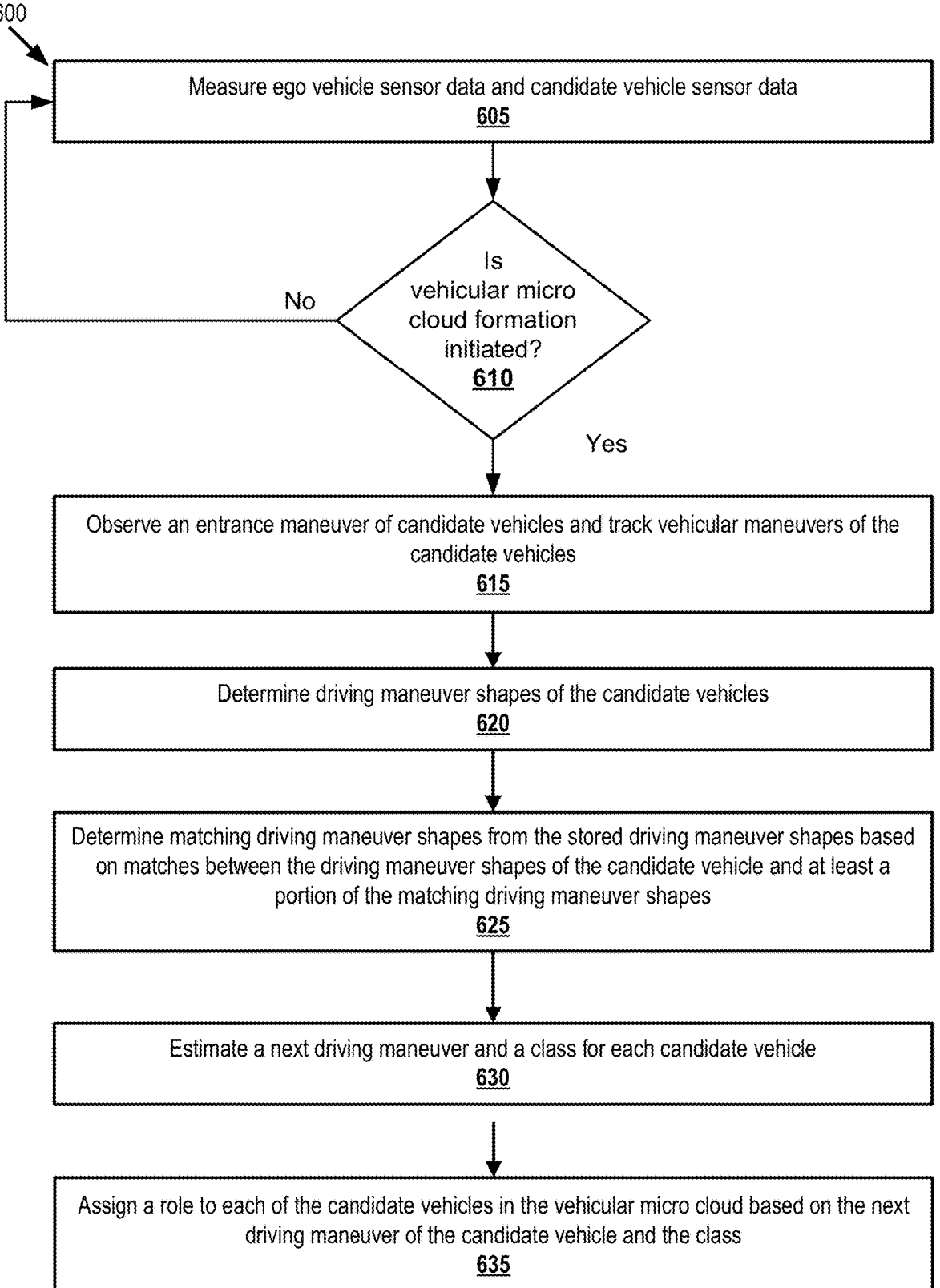
FIG. 6 is another flowchart of an example method for operation of a vehicular micro cloud according to some embodiments.

In some embodiments, the continuity system includes code and routines that are operable, when executed by a processor of the onboard unit, to cause the processor to execute one or more of the steps of the method 500 depicted in FIG. 5 or any other method described herein (e.g., the method 600 depicted in FIG. 6 or the example general method).

This patent application is related to U.S. patent application Ser. No. 15/644,197 filed on Jul. 7, 2017 and entitled "Computation Service for Mobile Nodes in a Roadway Environment," the entirety of which is hereby incorporated by reference. This patent application is also related to U.S. patent application Ser. No. 16/457,612 filed on Jun. 28, 2019 and entitled "Context System for Providing Cyber Security for Connected Vehicles," the entirety of which is hereby incorporated by reference.

Example Operative Environment

In some embodiments, the continuity system is software that is operable, when executed by a processor, to cause the processor to execute one or more of the methods described herein. An example operating environment 200 for the continuity system is depicted in FIG. 2.

In some embodiments, the continuity system 199 is software installed in an onboard unit (e.g., an electronic control unit (ECU)) of a particular make of vehicle having V2X communication capability. For example, the ego vehicle 123 includes a communication unit 145. The communication unit 145 includes a V2X radio. For example, the communication unit 145 includes a C-V2X radio. FIG. 2 depicts an example operating environment 200 for the continuity system 199 according to some embodiments.

Embodiments of the continuity system are now described. Referring now to FIG. 2, depicted is a block diagram illustrating an operating environment 200 for a continuity system 199 according to some embodiments. The operating environment 200 is present in a roadway environment 140. In some embodiments, each of the elements of the operating environment 200 is present in the same roadway environment 140 at the same time. In some embodiments, some of the elements of the operating environment 200 are not present in the same roadway environment 140 at the same time.

The operating environment 200 may include one or more of the following elements: an ego vehicle 123 (referred to herein as a "vehicle 123" or an "ego vehicle 123") operated by a driver 109; a remote connected vehicle 124 (which has a driver too, which is not pictured, in embodiments where the remote connected vehicle 124 is not at least a Level III autonomous vehicle); a cloud server 103; and an edge server 198. These elements are communicatively coupled to one another via a network 105. These elements of the operating environment 200 are depicted by way of illustration. In practice, the operating environment 200 may include one or more of the elements depicted in FIG. 2. For example, although only two vehicles 123, 124 are depicted in FIG. 2, in practice the operating environment 200 can include a plurality of these elements.

The operating environment 200 also includes the roadway environment 140. The roadway environment 140 was described above, and that description will not be repeated here.

In some embodiments, one or more of the ego vehicle 123, the remote connected vehicle 124, and the network 105 are elements (e.g., members) of a vehicular micro cloud 194.

In some embodiments, the ego vehicle 123 and the remote connected vehicle 124 include similar elements. For example, each of these elements of the operating environment 200 include their own processor 125, bus 121, memory 127, communication unit 145, processor 125, sensor set 126, onboard unit 139, standard-compliant GPS unit 150, and continuity system 199. These elements of the ego vehicle 123 and the remote connected vehicle 124 provide the same or similar functionality regardless of whether they are included in the ego vehicle 123 or the remote connected vehicle 124. Accordingly, the descriptions of these elements will not be repeated in this description for each of the ego vehicle 123 and the remote connected vehicle 124.

In the depicted embodiment, the ego vehicle 123 and the remote connected vehicle 124 store similar digital data. The system data 129 includes digital data that describes some or all of the digital data stored in the memory 127 or otherwise described herein. The system data 129 is depicted in FIG. 2 as being an element of the cloud server 103, but in practice the system data 129 is stored on one or more of the server, the ego vehicle 123, and one or more of the remote connected vehicles 124.

In some embodiments, the vehicular micro cloud 194 is a stationary vehicular micro cloud such as described by U.S. patent application Ser. No. 15/799,964 filed on Oct. 31, 2017 and entitled "Identifying a Geographic Location for a Stationary Micro-Vehicular Cloud," the entirety of which is herein incorporated by reference. The vehicular micro cloud 194 is depicted with a dashed line in FIG. 2 to indicate that it is an optional element of the operating environment 200.

In some embodiments, the vehicular micro cloud 194 includes a stationary vehicular micro cloud or a mobile vehicular micro cloud. For example, each of the ego vehicle 123 and the remote connected vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used herein, the terms a "vehicular micro cloud" and a "micro-vehicular cloud" mean the same thing.

In some embodiments, the vehicular micro cloud 194 is a vehicular micro cloud such as the one described in U.S. patent application Ser. No. 15/799,963.

In some embodiments, the vehicular micro cloud 194 includes a dynamic vehicular micro cloud. In some embodiments, the vehicular micro cloud 194 includes an interdependent vehicular micro cloud. In some embodiments, the vehicular micro cloud 194 is sub-divided into a set of nano clouds.

In some embodiments, the operating environment 200 includes a plurality of vehicular micro clouds 194. For example, the operating environment 200 includes a first vehicular micro cloud and a second vehicular micro cloud.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote connected vehicle 124, etc.) which has completed a process to join the vehicular micro cloud 194 (e.g., a handshake process with the coordinator of the vehicular micro cloud 194). Cloud servers are excluded from membership in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 171 describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the member data 171 describes the logical associations between more than one vehicular micro cloud. For example, the member data 171 describes the logical associations between the first vehicular micro cloud and the second vehicular micro cloud. Accordingly, in some embodiments the memory 127 includes member data 171 for more than one vehicular micro cloud 194.

In some embodiments, the vehicular micro cloud 194 does not include a hardware server. Accordingly, in some embodiments the vehicular micro cloud 194 may be described as serverless.

In some embodiments, the vehicular micro cloud 194 includes a server. For example, in some embodiments the vehicular micro cloud 194 includes the cloud server 103.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as a continuity endpoint for each wireless communication transmitted by the network 105. A continuity endpoint is the endpoint that initiated a wireless communication using the network 105. In some embodiments, the network 105 is a vehicular network. In some embodiments, the network 105 is a C-V2X network.

In some embodiments, the network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote connected vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote connected vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The ego vehicle 123 includes a car, a truck, a sports utility vehicle, a bus, a semi-truck, a drone, or any other roadway-based conveyance. In some embodiments, the ego vehicle 123 includes an autonomous vehicle or a semi-autonomous vehicle. Although not depicted in FIG. 2, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers. In some embodiments, the vehicle control system 153 is an autonomous driving system.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125; a sensor set 126; a standard-compliant GPS unit 150; a vehicle control system 153; a communication unit 145; an onboard unit 139; a memory 127; and a continuity system 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 2 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 is an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the continuity system 199. In some embodiments, the onboard unit 139 is the computer system 300 depicted in FIG. 3. In some embodiments, the onboard unit 139 is an electronic control unit (ECU).

The sensor set 126 includes one or more onboard sensors. The sensor set 126 records sensor measurements that describe the ego vehicle 123 and/or the physical environment (e.g., the roadway environment 140) that includes the ego vehicle 123. The ego sensor data 195 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope;

a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record ego sensor data 195. The ego sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. In some embodiments, the roadway environment 140 is a roadway that includes a roadway region. The ego sensor data 195 may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the continuity system 199 based on analysis of the ego sensor data 195 which is recorded by the ego vehicle 123 and/or one or more members of the vehicular micro cloud 194.

In some embodiments, the ego sensor data 195 includes digital data that describes all of the sensor measurements recorded by the sensor set 126 of the ego vehicle.

For example, the ego sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123. The depth information and the images describe the roadway environment 140, including tangible objects in the roadway environment 140 and any other physical aspects of the roadway environment 140 that are measurable using a depth sensor and/or a camera.

In some embodiments, the sensors of the sensor set 126 are operable to collect ego sensor data 195. The sensors of the sensor set 126 include any sensors that are necessary to measure and record the measurements described by the ego sensor data 195. In some embodiments, the ego sensor data 195 includes any sensor measurements that are necessary to generate the other digital data stored by the memory 127. In some embodiments, the ego sensor data 195 includes digital data that describes any sensor measurements that are necessary for the continuity system 199 provides its functionality as described herein with reference to the method 500 depicted in FIG. 5, the method 600 depicted in FIG. 6, and/or the example general method described herein.

In some embodiments, the sensor set 126 includes any sensors that are necessary to record ego sensor data 195 that describes the roadway environment 140 in sufficient detail to create a digital twin of the roadway environment 140. In some embodiments, the continuity system 199 generates the set of nano clouds and assigns sub-tasks to the nano clouds based on the outcomes observed by the continuity system 199 during the execution of a set of digital twins that simulate the real-life circumstances of the ego vehicle 123.

For example, in some embodiments the continuity system 199 includes simulation software. The simulation software is any simulation software that is capable of simulating an execution of a vehicular micro cloud task. For example, the simulation software is operable simulate the continuity system 199 providing its functionality to generate some or all of the system data 129. In some embodiments, the vehicular micro cloud 194 is divided into a set of nano clouds.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the continuity system 199. In some other embodiments, the simulation software is a standalone software that the continuity system 199 can access to execute digital twin simulations to determine stored driving maneuver shapes, determine matching driving maneuver shapes, estimate a next driving maneuver of a candidate vehicle, and/or determine a role for the candidate vehicle. In this way the digital twin simulations execute various simulations that attempt to help the continuity system to provide its functionality.

Digital twin data includes any digital data that is necessary to execute the digital twin simulations and output the continuity data. The digital twin data also describes the output of these digital twin simulations (e.g., the digital twin data includes the stored driving maneuver shapes, the matching driving maneuver shapes, the next driving maneuver, and the role for the candidate vehicle). An example of the digital twin data according to some embodiments includes the digital twin data 162 depicted in FIG. 2 as optional data. Digital twin simulations are described in more detail below.

Digital twins, and an example process for generating and using digital twins which is implemented by the continuity system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

In some embodiments, the continuity system 199 uses a machine-learning model to perform various functions related to increasing the continuity of the vehicular micro cloud. The machine-learning model may receive training data that includes the stored driving maneuver shapes for vehicles that join a vehicular micro cloud, perform maneuvers, and then leave the vehicular micro cloud. The stored driving maneuver shapes for the machine-learning model may be derived from data from a digital twin simulation, observed behavior of drivers that is location dependent, or accident data that is location dependent.

The machine-learning model may modify its parameters based on the training data. In some embodiments, the training data is supervised. For example, a user may label the different stored driving maneuver shapes with a class based on the movements, such as aggressive, calm, a tailgater, etc. In some embodiments, the training data is unsupervised and the machine-learning model performs clustering of the training data to identify characteristics between the different stored driving maneuver shapes.

In some embodiments, once the machine-learning model is trained using the training data, the machine-learning model receives a driving maneuver shape of a candidate vehicle as input and the machine-learning model outputs an estimate of the next driving maneuver of the candidate vehicle. In some embodiments, the machine-learning model also assigns a role to the candidate vehicle in the vehicular micro cloud based on the next driving maneuver of the candidate vehicle.

In some embodiments, once the continuity system 199 senses that the candidate vehicle leaves the vehicular micro cloud, the continuity system 199 modifies the parameters of the machine-learning model based on the updated data. This feedback improves the system because the machine-learning model can compare the actual data to the estimation to determine the accuracy of the estimation.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this ego vehicle 123 as provided by the standard-compliant GPS unit 150.

An example process for generating GPS data describing a geographic location of an object (e.g., a vehicle, a roadway object, an object of interest, a remote connected vehicle 124, the ego vehicle 123, or some other tangible object or construct located in a roadway environment 140) is now described according to some embodiments. In some embodiments, the continuity system 199 include code and routines that are operable, when executed by the processor 125, to cause the processor to: analyze (1) GPS data describing the geographic location of the ego vehicle 123 and (2) ego sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the continuity system 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the continuity system 199 to determine the lane of travel of the ego vehicle 123. This measurement improves the accuracy of the GPS data describing the location of lanes used by the ego vehicle 123 when the continuity system 199 is providing its functionality.

In some embodiments, the memory 127 stores two types of GPS data. The first is GPS data of the ego vehicle 123 and the second is GPS data of one or more objects (e.g., the remote connected vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the ego sensor data 195. For example, the standard-compliant GPS unit 150 is a sensor included in the sensor set 126 and the GPS data is an example type of ego sensor data 195.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the continuity system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection-Application interface EN 11253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); EN 13372:2004 Dedicated Short-Range Communication (DSRC)-DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 500 depicted in FIG. 5 is transmitted by the C-V2X radio on the upper 30 MHz of the 5.9 GHz band (i.e., 5.895-5.925 GHz) as directed by the continuity system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards or any other wireless communication standard that applies to wireless vehicular communications. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 2, the memory 127 stores the following digital data: shapes data 133 in a data structure 131; training data 135, digital twin data 162; V2X data 137; threshold data 141; member data 171; the ego sensor data 195 (including time data 155); and the remote sensor data 193 (including time data 154). The system data 129 includes some or all of this digital data. In some embodiments, the V2X messages (or C-V2X messages or the set of wireless messages) described herein are also stored in the memory 127. The above-described elements of the memory 127 were described above, and so, those descriptions will not be repeated here.

In some embodiments, the ego vehicle 123 includes a vehicle control system 153. A vehicle control system 153 includes one or more ADAS systems or an autonomous driving system. In some embodiments, the continuity system 199 uses some or all of the payload of the set of wireless messages described herein as inputs to the vehicle control system 153 to improve the operation of the vehicle control system 153 by increasing the quantity of data it has access to when controlling the operation of the ego vehicle 123.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness continuity system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the ego vehicle 123 and modify (or control) the operation of its host vehicle (e.g., the ego vehicle 123) to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle 123 may have a lane keeping assistance (LKA) system installed and operational in an ego vehicle 123 may detect, using one or more external cameras of the ego vehicle 123, an event in which the ego vehicle 123 is near passing a center yellow line which indicates a division of one lane of travel from another lane of travel on a roadway. The LKA system may provide a notification to a driver of the ego vehicle 123 that this event has occurred (e.g., an audible noise or graphical display) or take action to prevent the ego vehicle 123 from actually passing the center yellow line such as making the steering wheel difficult to turn in a direction that would move the ego vehicle over the center yellow line or actually moving the steering wheel so that the ego vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the continuity system 199 includes code and routines that are operable, when executed by the processor 125, to execute one or more steps of the example general method described herein. In some embodiments, the continuity system 199 includes code and routines that are operable, when executed by the processor 125, to execute one or more steps of the method 500 described below with reference to FIG. 5 the method 600 depicted in FIG. 6, or the general method.

Figure 3:
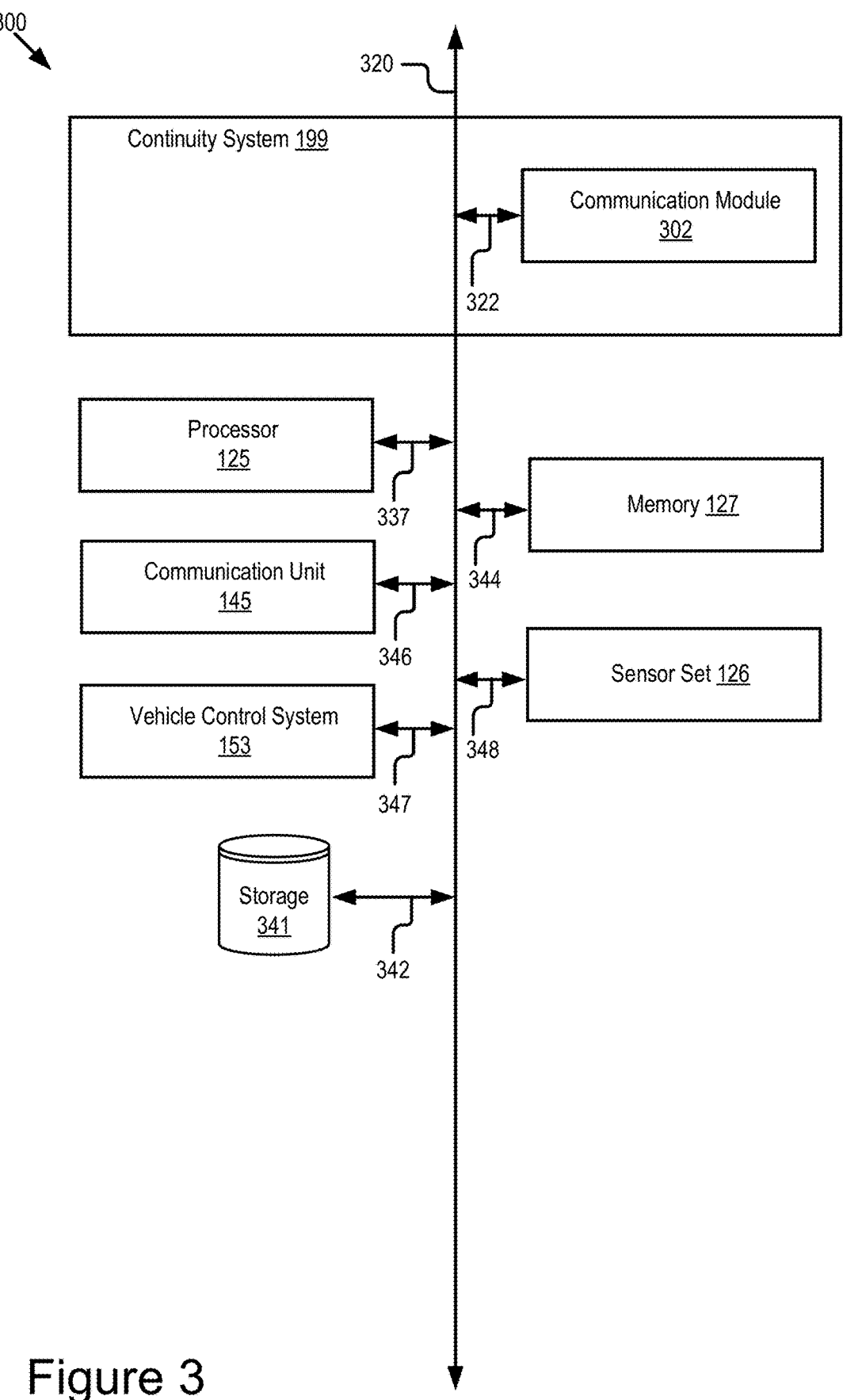
FIG. 3 is a block diagram illustrating an example computer system including a continuity system according to some embodiments.

An example embodiment of the continuity system 199 is depicted in FIG. 3. This embodiment is described in more detail below.

In some embodiments, the continuity system 199 is an element of the onboard unit 139 or some other onboard vehicle computer. In some embodiments, the continuity system 199 includes code and routines that are stored in the memory 127 and executed by the processor 125 or the onboard unit 139. In some embodiments, the continuity system 199 is an element of an onboard unit of the ego vehicle 123 which executes the continuity system 199 and controls the operation of the communication unit 145 of the ego vehicle 123 based at least in part on the output from executing the continuity system 199.

In some embodiments, the continuity system 199 is implemented using hardware including a field-programmable gate array ("FPGA") or an application-specific integrated circuit ("ASIC"). In some other embodiments, the continuity system 199 is implemented using a combination of hardware and software.

In some embodiments, the continuity system 199 is an element of the cloud server 103 and not an element of the ego vehicle 123 or any other vehicle such as the remote connected vehicle 124.

The remote connected vehicle 124 includes elements and functionality which are similar to those described above for the ego vehicle 123, and so, those descriptions will not be repeated here. In some embodiments, the ego vehicle 123 and the remote connected vehicle 124 are members of a vehicular micro cloud 194.

The roadway environment 140 is now described according to some embodiments. In some embodiments, some, or all of the ego vehicle 123 and the remote connected vehicle 124 (or a plurality of remote connected vehicles) are located in a roadway environment 140. In some embodiments, the roadway environment 140 includes one or more vehicular micro clouds 194. The roadway environment 140 is a portion of the real-world that includes a roadway, the ego vehicle 123 and the remote connected vehicle 124. The roadway environment 140 may include other elements such as roadway signs, environmental conditions, traffic, etc. The roadway environment 140 includes some or all of the tangible and/or measurable qualities described above with reference to the ego sensor data 195 and the remote sensor data 197. The remote sensor data 197 includes digital data that describes the sensor measurements recorded by the sensor set 126 of the remote connected vehicle 124.

In some embodiments, the real-world includes the real of human experience comprising physical objects and excludes artificial environments and "virtual" worlds such as computer simulations.

In some embodiments, the roadway environment 140 includes a roadside unit that in includes an edge server 198. In some embodiments, the edge server 198 is a connected processor-based computing device that includes an instance of the continuity system 199 and the other elements described above with reference to the ego vehicle 123 (e.g., a processor 125, a memory 127 storing the system data 129, a communication unit 145, etc.). In some embodiments, the roadway device is a member of the vehicular micro cloud 194.

In some embodiments, the edge server 198 includes one or more of the following: a hardware server; a personal computer; a laptop; a device such as a roadside unit; or any other processor-based connected device that is not a member of the vehicular micro cloud 194 and includes an instance of the continuity system 199 and a non-transitory memory that stores some or all of the digital data that is stored by the memory 127 of the ego vehicle 123 or otherwise described herein. For example, the memory 127 stores the system data 129. The system data 129 includes some or all of the digital data depicted in FIG. 2 as being stored by the memory 127.

In some embodiments, the edge server 198 includes a backbone network. In some embodiments, the edge server 198 includes an instance of the continuity system 199. The functionality of the continuity system 199 is described above with reference to the ego vehicle 123, and so, that description will not be repeated here.

In some embodiments, the cloud server 103 one or more of the following: a hardware server; a personal computer; a laptop; a device such as a roadside unit; or any other processor-based connected device that is not a member of the vehicular micro cloud 194 and includes an instance of the continuity system 199 and a non-transitory memory that stores some or all of the digital data that is stored by the memory 127 of the ego vehicle 123 or otherwise described herein. The cloud server 103 is operable to provide any other functionality described herein. For example, the cloud server 103 is operable to execute some or all of the steps of the methods described herein.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote connected vehicle 124, etc.), and optionally devices such as a roadway device, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at different times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third generation (3G), fourth generation (4G), fifth generation (5G), long-term evolution (LTE), Voice-over-LTE (VoLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the continuity system 199 includes encryption keys for encrypting wireless messages and decrypting the wireless messages described herein.

Referring now to FIG. 3, depicted is a block diagram illustrating an example computer system 300 including a continuity system 199 according to some embodiments.

In some embodiments, the computer system 300 may include a special-purpose computer system that is programmed to perform one or more steps of one or more of the method 500 described herein with reference to FIG. 5 the method 600 depicted in FIG. 6, and the example general method described herein.

In some embodiments, the computer system 300 may include a processor-based computing device. For example, the computer system 300 may include an onboard vehicle computer system of the ego vehicle 123 or the remote connected vehicle 124.

The computer system 300 may include one or more of the following elements according to some examples: the continuity system 199; a processor 125; a communication unit 145; a vehicle control system 153; a storage 341; and a memory 127. The components of the computer system 300 are communicatively coupled by a bus 320.

In some embodiments, the computer system 300 includes additional elements such as those depicted in FIG. 2 as elements of the continuity system 199.

In the illustrated embodiment, the processor 125 is communicatively coupled to the bus 320 via a signal line 337. The communication unit 145 is communicatively coupled to the bus 320 via a signal line 346. The vehicle control system 153 is communicatively coupled to the bus 320 via a signal line 347. The storage 341 is communicatively coupled to the bus 320 via a signal line 342. The memory 127 is communicatively coupled to the bus 320 via a signal line 344. The sensor set 126 is communicatively coupled to the bus 320 via a signal line 348.

In some embodiments, the sensor set 126 includes standard-compliant GPS unit. In some embodiments, the communication unit 145 includes a sniffer.

The following elements of the computer system 300 were described above with reference to FIG. 2, and so, these descriptions will not be repeated here: the processor 125; the communication unit 145; the vehicle control system 153; the memory 127; and the sensor set 126.

The storage 341 can be a non-transitory storage medium that stores data for providing the functionality described herein. The storage 341 may be a DRAM device, a SRAM device, flash memory, or some other memory devices. In some embodiments, the storage 341 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the continuity system 199 includes code and routines that are operable, when executed by the processor 125, to cause the processor 125 to execute one or more steps of the method 500 described herein with reference to FIG. 5 or one or more steps of the method 600 described herein with reference to FIG. 6. In some embodiments, the continuity system 199 includes code and routines that are operable, when executed by the processor 125, to cause the processor 125 to execute one or more steps of the example general method.

In the illustrated embodiment shown in FIG. 3, the continuity system 199 includes a communication module 302.

The communication module 302 can be software including routines for handling communications between the continuity system 199 and other components of the computer system 300. In some embodiments, the communication module 302 can be a set of instructions executable by the processor 125 to provide the functionality described below for handling communications between the continuity system 199 and other components of the computer system 300. In some embodiments, the communication module 302 can be stored in the memory 127 of the computer system 300 and can be accessible and executable by the processor 125. The communication module 302 may be adapted for cooperation and communication with the processor 125 and other components of the computer system 300 via signal line 322.

The communication module 302 sends and receives data, via the communication unit 145, to and from one or more elements of the operating environment 200.

In some embodiments, the communication module 302 receives data from components of the continuity system 199 and stores the data in one or more of the storage 341 and the memory 127.

In some embodiments, the communication module 302 may handle communications between components of the continuity system 199 or the computer system 300.

Figure 4A:
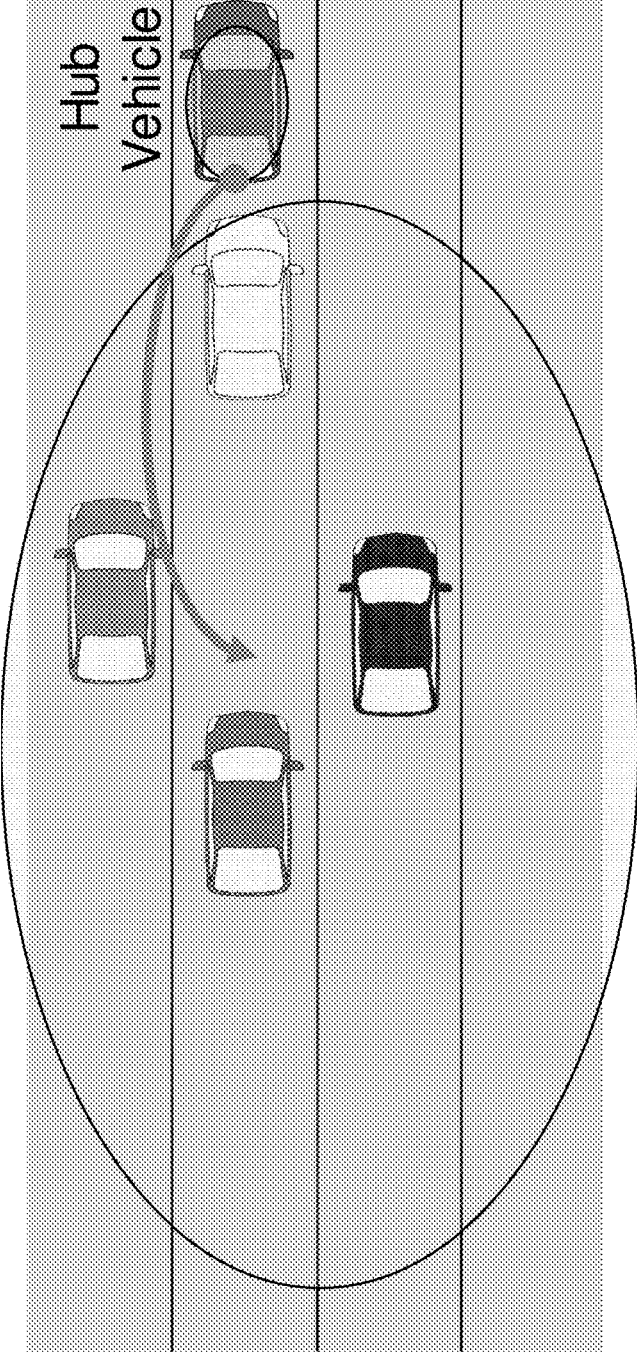
FIG. 4A-4B is a block diagram of an example use case according to some embodiments.
Figure 4B:
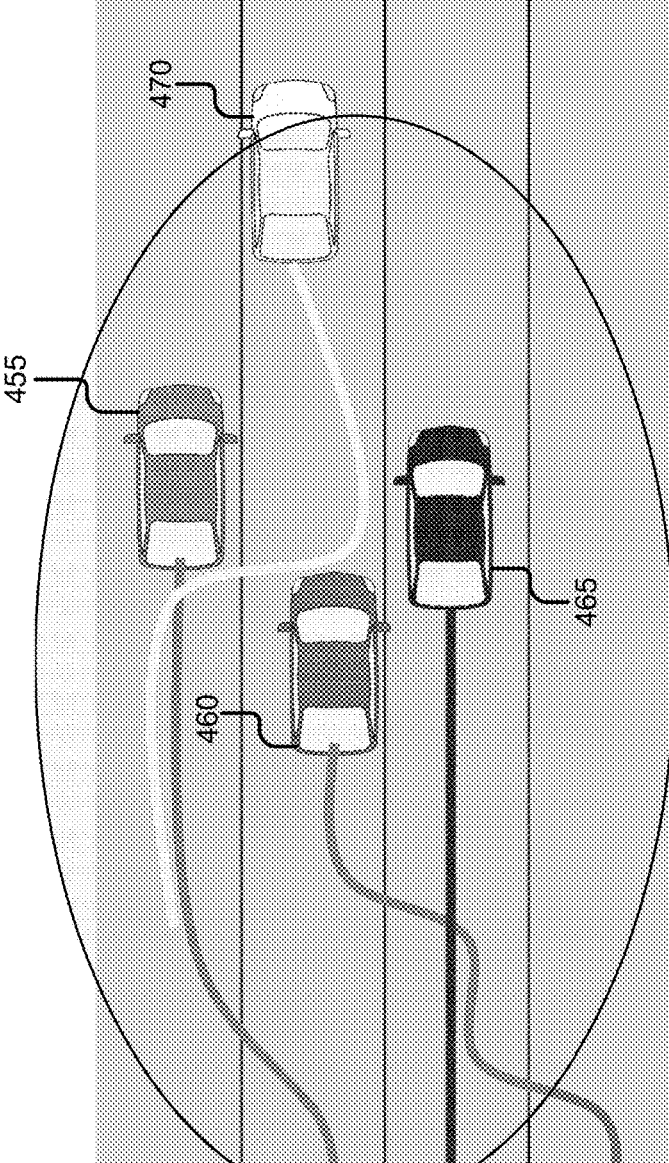

Referring now to FIGS. 4A-4B, depicted is a block diagram of an example use case according to some embodiments.

FIG. 4A illustrates a block diagram 400 of a hub vehicle that is leaving the vehicular micro cloud. As explained above, because the hub vehicle performs important functions for the vehicular micro cloud, such as assigning tasks to other vehicles within the vehicular micro cloud, this triggers a need to assign a new hub vehicle for the vehicular micro cloud.

FIG. 4B illustrates a block diagram 450 of the candidate vehicles in the vehicular micro vehicle and their corresponding driving maneuver shapes. In some embodiments, the continuity system senses each candidate vehicle and their corresponding driving maneuver shapes. The continuity system may receive driving maneuver information that describes how each candidate vehicle intends to move in the next three seconds. The continuity system may also request additional information from the candidate vehicles, such as driving maneuver information before the candidate vehicles join the vehicular micro cloud.

As illustrated in FIG. 4B, each driving maneuver shape can indicate different characteristics about the candidate vehicles. For example, the driving maneuver shape for candidate vehicle 455 indicates that the candidate vehicle 455 made a lane change but that there is a likelihood that the candidate vehicle 455 will remain in the vehicular micro cloud. Conversely, the driving maneuver shape for candidate vehicle 460 indicates that the candidate vehicle 460 is likely to leave the vehicular micro cloud because the vehicle is making enough left-hand lane changes that it appears to be exiting the roadway.

The continuity system compares the driving maneuver shapes for the candidate vehicles in FIG. 4B to stored driving maneuver shapes to identify a matching driving maneuver shape for each of the candidate vehicles. The continuity system may estimate a next driving maneuver for each of the candidate vehicles and assign roles to the candidate vehicles accordingly. In some embodiments, the continuity system identifies a best candidate vehicle for a particular role based on the next driving maneuvers and a characterization of the driving maneuver shapes. For example, the driving maneuver shape for candidate vehicle 465 in FIG. 4B indicates that the candidate vehicle 465 is likely to stay within the vehicular micro cloud because the driving maneuver shape is predictable. Conversely, the driving maneuver shape for candidate vehicle 470 indicates that the driver is driving aggressively because the driving maneuver shape illustrates that the candidate vehicle 470 changed lanes far too close to candidate vehicle 455 and candidate vehicle 460. This candidate vehicle 470 would be a bad candidate for a hub vehicle, but might be more ideal for a different role, such as disseminating a message quickly.

Referring now to FIGS. 5, depicted is a flowchart of an example method 500 for operation of a vehicular micro cloud by increasing a continuity of a vehicular micro cloud service provided by the vehicular micro cloud according to some embodiments. The method 500 includes step 505, step 510, step 515, and step 520 as depicted in FIG. 5. The steps of the method 500 may be executed in any order, and not necessarily those depicted in FIG. 5. In some embodiments, one or more of the steps are skipped or modified in ways that are described herein or known or otherwise determinable by those having ordinary skill in the art of vehicular micro clouds.

In some embodiments, at block 505, a data structure of stored driving maneuver shapes is maintained. At block 510, a candidate vehicle and a driving maneuver shape are sensed. At block 515, a matching driving maneuver shape is determined from the stores driving maneuver shapes based on a match between the driving maneuver shape of the candidate vehicle and at least a portion of the matching driving maneuver shape. At block 520, a next driving maneuver of the candidate vehicle is estimated. At block 525, a role is assigned to the candidate vehicle in the vehicular micro cloud based on the next driving maneuver of the candidate vehicle to improve the operation of the vehicular micro cloud by increasing the continuity of the vehicular micro cloud service provided by the vehicular micro cloud.

Referring now to FIG. 6, depicted is another flowchart of an example method 600 for operation of a vehicular micro cloud according to some embodiments. The method 600 includes step 605, step 610, step 615, and step 620 as depicted in FIG. 6. The steps of the method 600 may be executed in any order, and not necessarily those depicted in FIG. 6. In some embodiments, one or more of the steps are skipped or modified in ways that are described herein or known or otherwise determinable by those having ordinary skill in the art of vehicular micro clouds.

At block 605, ego vehicle sensor data and candidate vehicle sensor data are measured. At block 610, it is determined whether formation of a vehicular micro cloud is initiated. If the vehicular micro cloud is not formed, the method 600 returns to block 605. If the vehicular micro cloud is formed, the method 600 proceeds to block 615. At block 615, an entrance maneuver of candidate vehicles is observed and vehicular maneuvers of the candidate vehicles are tracked. At block 620, driving maneuver shapes of the candidate vehicles are determined. At block 625, matching driving maneuver shapes from the stored driving maneuver shapes are determined based on matches between the driving maneuver shapes of the candidate vehicle and at least a portion of the matching driving maneuver shapes. At block 630, a next driving maneuver and a class are estimated for each candidate vehicle. At block 635, a role is assigned to each of the candidate vehicles in the vehicular micro cloud based on the next driving maneuver and the class.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A continuity system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the continuity system to become coupled to other continuity systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method to improve an operation of a vehicular micro cloud by increasing a continuity of a vehicular micro cloud service provided by the vehicular micro cloud, the method comprising:

maintaining a data structure of stored driving maneuver shapes, wherein each stored driving maneuver shape includes a set of driving maneuvers determined based at least in part on execution of a set of digital twin simulations that model vehicle behaviors in a vehicular micro cloud environment;

sensing a candidate vehicle and a driving maneuver shape of the candidate vehicle;

determining a matching driving maneuver shape from the stored driving maneuver shapes based on each driving maneuver in the driving maneuver shape being within a threshold similarity value of a corresponding matching driving maneuver from the stored driving maneuver shapes;

estimating a next driving maneuver of the candidate vehicle based at least in part on the execution of the set of digital twin simulations that model vehicle behaviors in the vehicular micro cloud environment to predict whether the candidate vehicle will leave the vehicular micro cloud within a predetermined time period; and assigning a role to the candidate vehicle in the vehicular micro cloud based on the next driving maneuver of the candidate vehicle, wherein the role includes executing one or more vehicular micro cloud tasks whose execution provides the vehicular micro cloud service and handing over the one or more vehicular micro cloud tasks to another vehicle in the vehicular micro cloud upon the candidate vehicle leaving the vehicular micro cloud to maintain the continuity of the vehicular micro cloud service.

2. The method of claim 1, wherein estimating the next driving maneuver is based on the set of driving maneuvers in the matching driving maneuver shape including steps not yet performed by the candidate vehicle and wherein the estimate includes a prediction that candidate vehicle will leave the vehicular micro cloud with the next driving maneuver, wherein the steps not yet performed are simulated in the set of digital twin simulations to refine the prediction.

3. The method of claim 1, wherein:

estimating the next driving maneuver of the candidate vehicle is performed by a machine-learning model; and the machine-learning model was trained using one or more of data from a digital twin simulation, observed behavior of drivers that is location dependent, or accident data that is location dependent.

4. The method of claim 3, further comprising:

sensing that the candidate vehicle left the vehicular micro cloud; and modifying parameters of the machine-learning model.

5. The method of claim 1, wherein sensing the driving maneuver shape of the candidate vehicle occurs responsive to the candidate vehicle entering the vehicular micro cloud.

6. The method of claim 1, wherein the role includes serving as a hub for the vehicular micro cloud.

7. The method of claim 1, wherein the role includes executing one or more vehicular micro cloud tasks whose execution provides the vehicular micro cloud service and serving as a central hub that coordinates communication and data exchange among vehicles in the vehicular micro cloud to support the execution of the one or more vehicular micro cloud tasks.

8. The method of claim 1, wherein the method is executed by an edge server that is an element of a roadside unit.

9. The method of claim 1, wherein the role is determined based at least in part on an execution of the set of digital twin simulations, wherein the set of digital twin simulations model location-dependent driver behaviors.

10. The method of claim 1, wherein the next driving maneuver is estimated based at least in part on an execution of the set of digital twin simulations, wherein the execution of the set of digital twin simulations incorporates observed behavior of drivers that is location dependent.

11. The method of claim 1, wherein the matching driving maneuver shape is determined based at least in part on an execution of the set of digital twin simulations.

12. The method of claim 1, wherein the stored driving maneuver shapes are determined based at least in part on execution of the set of digital twin simulations, wherein the execution of the set of digital twin simulations incorporates accident data that is location dependent.

13. The method of claim 1, wherein the next driving maneuver indicates that the candidate vehicle is predicted to leave the vehicular micro cloud within a predetermined time period and the role is assigned based on predicting that the candidate vehicle will leave the vehicular micro cloud within the predetermined time period, wherein the predetermined time period is dynamically adjusted based on outputs from the set of digital twin simulations.

14. A system comprising:

a non-transitory memory;

a vehicle control system; and a processor communicatively coupled to the non-transitory memory and the vehicle control system, wherein the non-transitory memory stores computer readable code that is operable, when executed by the processor, to cause the processor to execute operations including:

maintaining a data structure of stored driving maneuver shapes, wherein each stored driving maneuver shape includes a set of driving maneuvers determined based at least in part on execution of a set of digital twin simulations that model vehicle behaviors in a vehicular micro cloud environment;

sensing a candidate vehicle and a driving maneuver shape of the candidate vehicle;

determining a matching driving maneuver shape from the stored driving maneuver shapes based on each driving maneuver in the driving maneuver shape being within a threshold similarity value of a corresponding matching driving maneuver from the stored driving maneuver shapes;

estimating a next driving maneuver of the candidate vehicle based at least in part on the execution of the set of digital twin simulations that model vehicle behaviors in the vehicular micro cloud environment to predict whether the candidate vehicle will leave the vehicular micro cloud within a predetermined time period; and assigning a role to the candidate vehicle in the vehicular micro cloud based on the next driving maneuver of the candidate vehicle, wherein the role includes executing one or more vehicular micro cloud tasks whose execution provides the vehicular micro cloud service and handing over the one or more vehicular micro cloud tasks to another vehicle in the vehicular micro cloud upon the candidate vehicle leaving the vehicular micro cloud to maintain the continuity of the vehicular micro cloud service.

15. The system of claim 14, wherein estimating the next driving maneuver is based on the set of driving maneuvers in the matching driving maneuver shape including steps not yet performed by the candidate vehicle and wherein the estimate includes a prediction that candidate vehicle will leave the vehicular micro cloud with the next driving maneuver, wherein the steps not yet performed are simulated in the set of digital twin simulations to refine the prediction.

16. The system of claim 14, wherein:
estimating the next driving maneuver of the candidate vehicle is performed by a machine-learning model; and
the machine-learning model was trained using one or more of data from a digital twin simulation, observed behavior of drivers that is location dependent, or accident data that is location dependent.

17. The system of claim 16, wherein the operations further comprise:
sensing that the candidate vehicle left the vehicular micro cloud; and
modifying parameters of the machine-learning model.

18. The system of claim 14, wherein sensing the driving maneuver shape of the candidate vehicle occurs responsive to the candidate vehicle entering the vehicular micro cloud.

19. The system of claim 14, wherein the role includes serving as a hub for the vehicular micro cloud.

20. A computer program product including computer code stored on a non-transitory memory that is operable, when executed by an onboard vehicle computer of a vehicle, to cause the onboard vehicle computer to execute operations including:

maintaining a data structure of stored driving maneuver shapes, wherein each stored driving maneuver shape includes a set of driving maneuvers determined based at least in part on execution of a set of digital twin simulations that model vehicle behaviors in a vehicular micro cloud environment;

sensing a candidate vehicle and a driving maneuver shape of the candidate vehicle;

determining a matching driving maneuver shape from the stored driving maneuver shapes based on each driving maneuver in the driving maneuver shape being within a threshold similarity value of a corresponding matching driving maneuver from the stored driving maneuver shapes;

estimating a next driving maneuver of the candidate vehicle based at least in part on the execution of the set of digital twin simulations that model vehicle behaviors in the vehicular micro cloud environment to predict whether the candidate vehicle will leave the vehicular micro cloud within a predetermined time period; and assigning a role to the candidate vehicle in the vehicular micro cloud based on the next driving maneuver of the candidate vehicle, wherein the role includes executing one or more vehicular micro cloud tasks whose execution provides the vehicular micro cloud service and handing over the one or more vehicular micro cloud tasks to another vehicle in the vehicular micro cloud upon the candidate vehicle leaving the vehicular micro cloud to maintain the continuity of the vehicular micro cloud service.

* * * * *